United States Patent
Deivasigamani et al.

(10) Patent No.: US 11,137,316 B2
(45) Date of Patent: Oct. 5, 2021

(54) LEAK DETECTION SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 17/011,162

(22) Filed: Sep. 3, 2020

(65) Prior Publication Data
US 2020/0400527 A1 Dec. 24, 2020

Related U.S. Application Data

(63) Continuation-in-part of application No. 16/599,957, filed on Oct. 11, 2019, now Pat. No. 10,794,792, which is a continuation-in-part of application No. 15/883,873, filed on Jan. 30, 2018, now Pat. No. 10,480,822, which is a continuation-in-part of application No. 15/859,169, filed on Dec. 29, 2017, now Pat. No. 10,486,082.

(60) Provisional application No. 62/451,891, filed on Jan. 30, 2017.

(51) Int. Cl.
G01M 3/18 (2006.01)
F24H 9/16 (2006.01)
F24H 8/00 (2006.01)

(52) U.S. Cl.
CPC .......... *G01M 3/186* (2013.01); *F24H 8/006* (2013.01); *F24H 9/165* (2013.01)

(58) Field of Classification Search
CPC ................. F24H 8/006; F24H 9/165; G01M 3/02–3/188
See application file for complete search history.

(56) References Cited

U.S. PATENT DOCUMENTS

| 4,289,730 A | 9/1981 | Tomlinson | |
|---|---|---|---|
| 4,888,455 A * | 12/1989 | Hanson | H01H 35/42 200/61.04 |
| 7,398,676 B2 | 7/2008 | Lim et al. | |
| 10,458,876 B1 * | 10/2019 | Billman | G01M 3/18 |

* cited by examiner

Primary Examiner — Terry K Cecil
(74) Attorney, Agent, or Firm — Tracy Jong Law Firm; Tracy P. Jong; Cheng Ning Jong

(57) ABSTRACT

A structure for detecting a leak, wherein the structure is supported upon a supporting surface, the structure including a leak detector; and a bottom-facing surface comprising an inverted depression in which the leak detector is disposed, the inverted depression is configured to be suitable for inducing capillary actions in a liquid collected on the supporting surface, wherein when the inverted depression comes in contact with the liquid at its periphery, the liquid is drawn to the leak detector to be detected.

6 Claims, 25 Drawing Sheets

LEAK DETECTION SYSTEM

PRIORITY CLAIM AND RELATED APPLICATIONS

This Continuation-In-Part application claims the benefit of priority from non-provisional application U.S. Ser. No. 16/599,957 filed Oct. 11, 2019, non-provisional application U.S. Ser. No. 15/883,873 filed Jan. 30, 2018, non-provisional application U.S. Ser. No. 15/859,169 filed Dec. 29, 2017 and provisional application U.S. Ser. No. 62/451,891 filed Jan. 30, 2017. Each of said applications is incorporated by reference in its entirety.

BACKGROUND OF THE INVENTION

1. The Field of the Invention

The present invention relates to a leak detection system. More specifically, the present invention is directed to a leak detection system capable of detecting a leak in a heating system where the leak is confined within and obscured by the heating system and its condensate drainage line.

2. Background Art

Condensate generation is one of the hallmarks of a high efficiency (e.g., greater than 90% efficiency) condensing combustion system. A high efficiency condensing combustion system achieves high efficiency by condensing water vapor in the flue gases and recovering its latent heat of vaporization. The result is condensed vapor that is typically collected and put through a neutralizer and drained. Condensate is an acidic solution containing various concentrations of nitric, nitrous, sulfuric, sulfurous acids and hydrochloric acids and can be harmful for drainage pipes, septic tanks, treatment plants and other waste handling systems. In conventional neutralizer systems, calcium carbonate may be used as a neutralizing agent to raise the pH of collected condensate before it is drained as an effluent. However, conventional condensate neutralizer systems put the burden of proper condensate neutralization on the shoulders of their users or maintenance personnel, or collectively their stakeholders. In many occasions, stakeholders have neglected to either come up with or follow maintenance schedules. Further, preventative maintenance of condensate neutralizing materials may cause unnecessary replacement of still effective neutralizing materials, thereby causing unnecessary waste not only in the neutralizing materials but also additional labor.

U.S. Pat. No. 4,289,730 to Tomlinson (herein after Tomlinson) discloses a high efficiency domestic furnace incorporating means for separating and neutralizing flue gas condensate. Acidic condensate from the flue gas products of combustion is neutralized by contact with neutralizing material in a housing through which the condensate is flowed. The use of the neutralizer in connection with a high efficiency domestic furnace permits discharge of the condensate directly to the household drain. The neutralizer is arranged to be self-flushing and defines a serpentine, series flow path and is arranged to discharge the neutralized condensate as a result of the entry of additional acidic condensate at its inlet. The neutralizing material is a consumable material and therefore it depletes when it comes in contact with condensate. Once Tomlinson's condensate neutralizing material is depleted, the user is not alerted and for the proper functioning of Tomlinson's neutralizer, a maintenance schedule must be made available and adhered to in order to ensure sufficient neutralizing material is available for neutralizing condensate. Further, in Tomlinson, there are no measures to determine the quality of the effluent. Therefore, it is possible that the condensate is not properly neutralized (even with some neutralizing material remaining in the neutralizer but still discharged.

U.S. Pat. No. 7,398,676 to Lim et al. (herein after Lim) discloses a leak sensor and a leak sensing system are provided. The leak sensor preferably includes a fluid sensing member that is capable of sensing and indicating the presence of a fluid leaked from a fluid storage or transport member. The leak sensor further preferably includes at least two wires communicating with the fluid sensing member. The wires are preferably configured to be short-circuited when they contact the fluid leaked from the fluid storage or transport member. An electrical signal corresponding to a leak sensor location can thereby be sent to a control terminal of the leak sensing system. A portion of the wires may be arranged in a cable coated with a protective material such as Teflon®. The control box (or terminal) preferably receives electrical signals from a plurality of leak sensors. The electrical signals can provide information on whether the fluid has leaked and on which leak sensor or sensors have detected the fluid leak. Lim discloses both a leak sensor and litmus paper but fails to disclose a method for detecting a leak by determining the pH of a leaked chemical.

Both Tomlinson and Lim are silent regarding leak detection strategies for leaks that are obscured by a heating system and its condensate drainage line. There exists a need for a condensate neutralizer device, a condensate generating device or another device that is capable of detecting an obscured leak through a heating system and its condensate drainage line and more generally a leak collecting on a supporting surface.

SUMMARY OF THE INVENTION

In accordance with the present invention, there is provided a structure for detecting a leak, wherein the structure is supported upon a supporting surface, the structure including:
  (a) a leak detector; and
  (b) a bottom-facing surface comprising an inverted depression in which the leak detector is disposed, the inverted depression is configured to be suitable for inducing capillary actions in a liquid collected on the supporting surface, wherein when the inverted depression comes in contact with the liquid, the liquid is drawn to the leak detector to be detected.

In one embodiment, the structure includes at least one capillary contiguous to the inverted depression to increase the opportunity that the liquid comes in contact with the inverted depression and the leak detector.

An object of the present invention is to provide a means for detecting a leak that occurs within a heating system where no evidence of the leak is readily available to stakeholders of the heating system.

Another object of the present invention is to provide a means for detecting a leak that has collected on a supporting surface of a structure.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
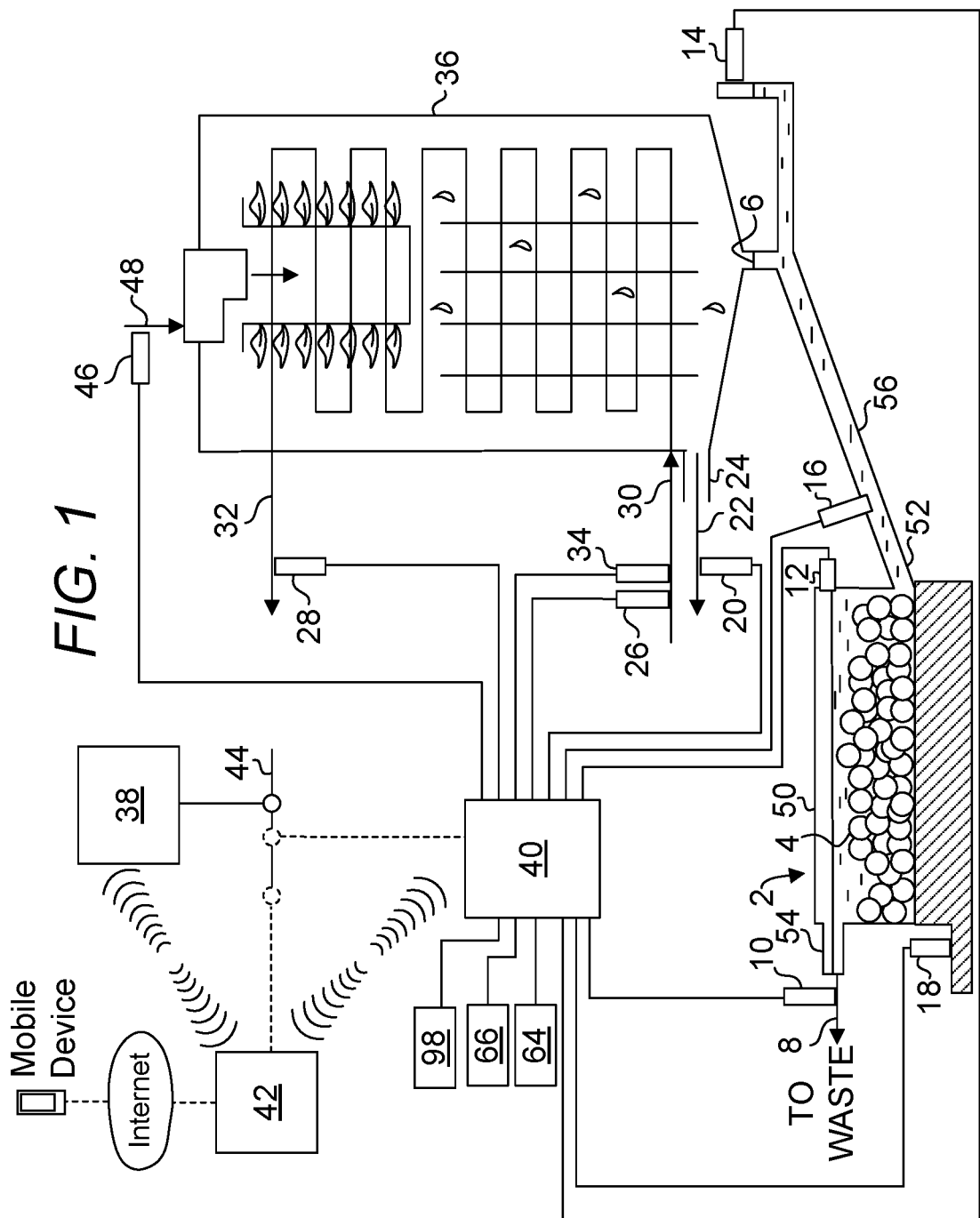
FIG. 1 is a diagram depicting a condensate neutralizer system and the equipment configured for monitoring the health of a tankless water heater which supplies condensate neutralized in the condensate neutralizer system.

2—condensate neutralizer system
4—condensate neutralizing material, e.g., calcium carbonate
6—pre-treated condensate
8—post-treated condensate
10—pH meter
12—condensate neutralizing material level sensor
14—level sensor
16—condensate temperature sensor
18—leak detector
20—flue temperature sensor
22—flue
24—flue exhaust
26—inlet temperature sensor
28—outlet temperature sensor
30—inlet of fluid to be heated
32—outlet of heated fluid 34—flowrate sensor
36—condensate generating device
38—controller for condensate generating device
40—controller for condensate neutralizer system
42—router
44—communication bus
46—fuel flowrate sensor
48—fuel flow
50—container
52—inlet of condensate neutralizer
54—outlet of condensate neutralizer
56—drainage line
58—portion indicating accelerating drop in pH
60—baffle
62—aperture
64—gas detector
66—carbon monoxide (CO) detector
68—period of pH drop
70—period of pH recovery
72—operational setting of condensate generating device
74—pH reading
76—portion indicating operational setting of condensate generating device not discernibly affecting the pH readings
78—capillary
80—overflow channel
82—support
84—inverted depression
86—compartment
88—media box
90—cover
92—handle
94—protrusion, wall or tongue
96—groove
98—cut-off switch
100—media cover
102—front cover
104—port
106—port
108—opening
110—opening
112—perforated bag
114—sealant
116—tube
118—perforated cover
120—auger
122—leak inside condensate generating device
124—no-leak zone
126—leak zone
128—onset of leak
130—breach in barrier
132—height of inverted depression or capillary Particular Advantages of the Invention In one embodiment, a present leak detection system is useful for detecting a leak which occurs within a closed housing of a heating system where the leak is not immediately evident to the naked eye from the exterior appearance of the heating system and the condensate neutralizer device connected to it as the leak does not lead to the exit of a liquid from within the closed housing of the heating system and the condensate neutralizer device connected to it.

In one embodiment, a present leak detection system is useful for detecting a leak that has collected on a supporting surface, e.g., floor. A structure with a bottom-facing surface configured to have an inverted depression and a plurality of capillaries connected to the inverted depression is useful for drawing a leaked liquid to be detected when it has collected on the supporting surface. Capillary actions occur in a capillary when the bottom surface is exposed to the leaked liquid such that a leak detector disposed within the inverted depression can detect the presence of the leaked liquid within the inverted depression as it is drawn there by the capillary.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "stakeholder" is used herein to mean a user, maintenance personnel, repair personnel, etc., or any personnel that uses, maintains or repairs, owns or manages a condensate neutralizer system and/or a condensate generating device connected to the condensate neutralizer system.

FIG. 1 is a diagram depicting a condensate neutralizer system 2 and the equipment configured for monitoring the health of a tankless water heater which supplies condensate neutralized in the condensate neutralizer system 2. The condensate neutralizer system 2 includes a container 50 having an inlet 52 and an outlet 54, a controller 40 and a pH meter 10. The inlet 52 is configured to receive condensate 6 from the condensate generating device 36, e.g., a water heater or a tankless water heater, the container 50 is configured to contain a condensate neutralizing material 4 useful for treating the condensate 6 and the outlet 54 is configured to drain condensate 8 treated with the condensate neutralizing material 4. The pH meter 10 is functionally connected to the controller 40 and is configured to take pH measurement of the effluent of condensate neutralizer system 2. The condensate generating device or more specifically, tankless water heater 36 in this instance, includes a burner configured to receive a fuel/air mixture or hereinafter, fuel flow 48 to heat the fluid or water flow received via an inlet 30 of a tube and exits via an outlet 32 of the tube. During operation of the tankless water heater 36, flue gas 22 that is generated due to combustion at the burner is guided to an exit via flue exhaust 24. A condensate generating device is typically equipped with its own controller 38 and a host of sensors, e.g., inlet water temperature sensor, outlet water temperature sensor, water flowrate sensor, flue temperature sensor functionally connected to controller 38. Inlet water temperature sensor 26, outlet water temperature sensor 28, water flowrate sensor 34 may be provided in addition to the native sensors already provided with the condensate generating device 36 at time of manufacture to avoid the need to tap into these sensors. However, if necessary, the readings of such sensors may readily be obtained by controller 40 from controller 38 via either a wired communication bus 44 or wirelessly via internet router 42. A fuel flowrate sensor 46 that is functionally connected to controller 40 is configured to provide the fuel flowrate to controller 40. Further, a flue temperature sensor 20 that is also functionally connected to controller 40 is configured to provide the flue temperature at flue exhaust 24. In one embodiment, the energy efficiency of a condensate generating device is inferred from its flue temperature as reported by the flue temperature sensor 20. Upon obtaining the flue temperature, the efficiency of the condensate generating device is looked up from a factory calibrated table correlating flue temperature readings and efficiency of a condensate generating device. In one embodiment, there is further provided a cut-off switch 98 functionally connected to the controller 40, where the cut-off switch 98 is configured for shutting down water supply and/or fuel supply to a condensate generating device and/or the condensate generating device itself and/or the heating request to the condensate generating device, e.g., when a water and/or condensate leak has been detected or when any other potentially hazardous conditions, e.g., the presence of CO, has been detected, etc.

Figure 2:
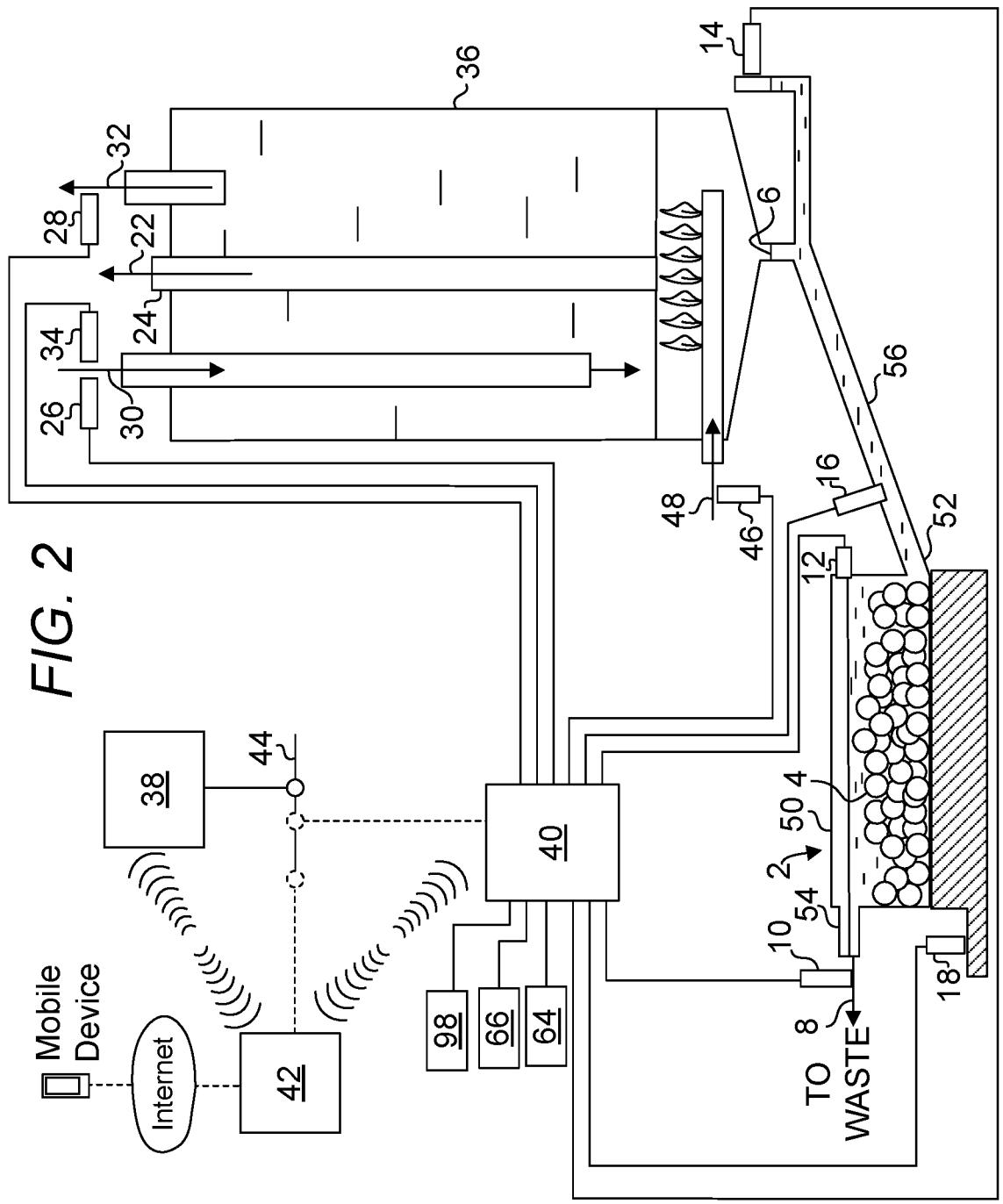
FIG. 2 is a diagram depicting a condensate neutralizer system and the equipment configured for monitoring the health of a tank water heater which supplies condensate neutralized in the condensate neutralizer system.
Figure 3:
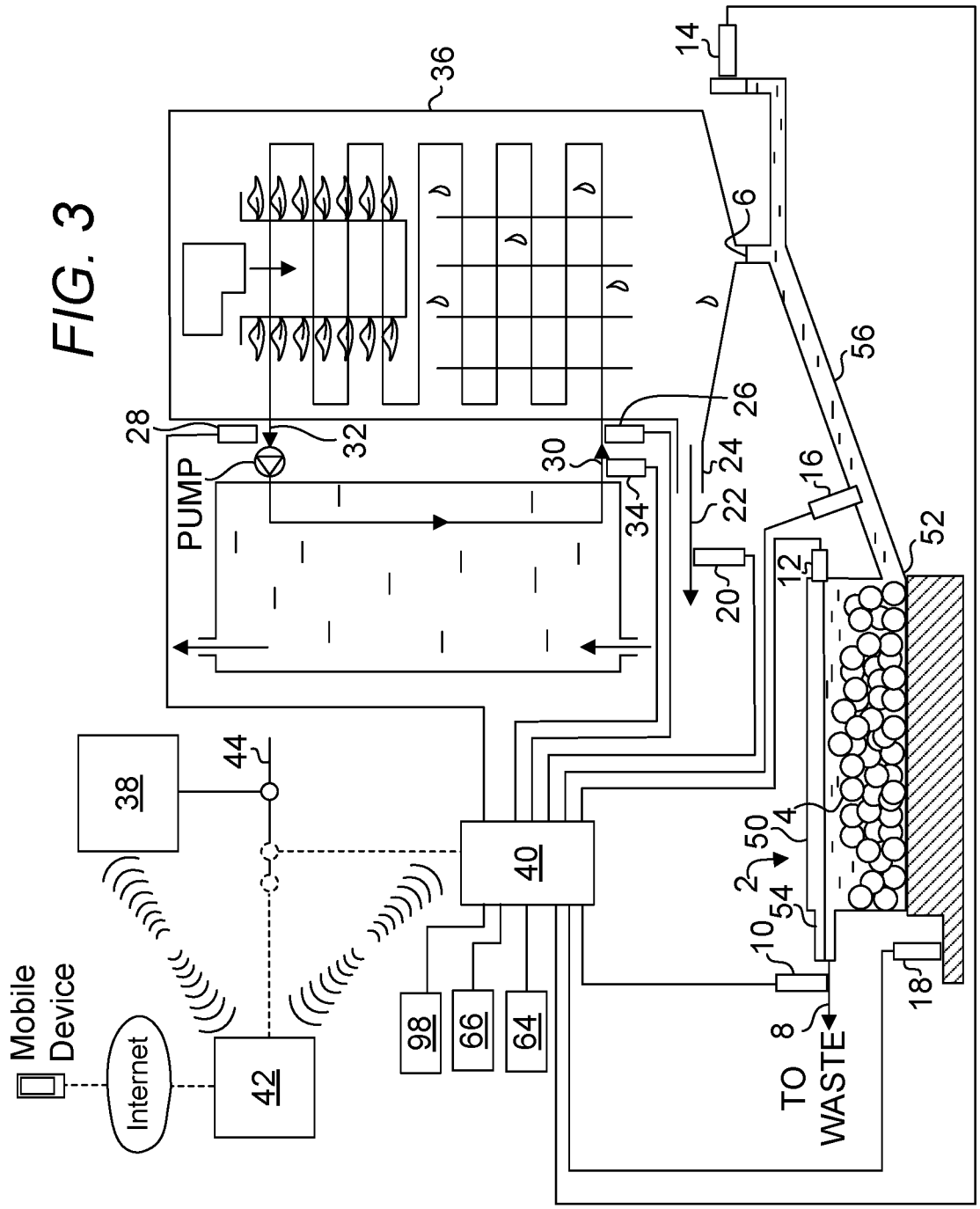
FIG. 3 is a diagram depicting a condensate neutralizer system and the equipment configured for monitoring the health of a boiler water heater which supplies condensate neutralized in the condensate neutralizer system.
Figure 4:
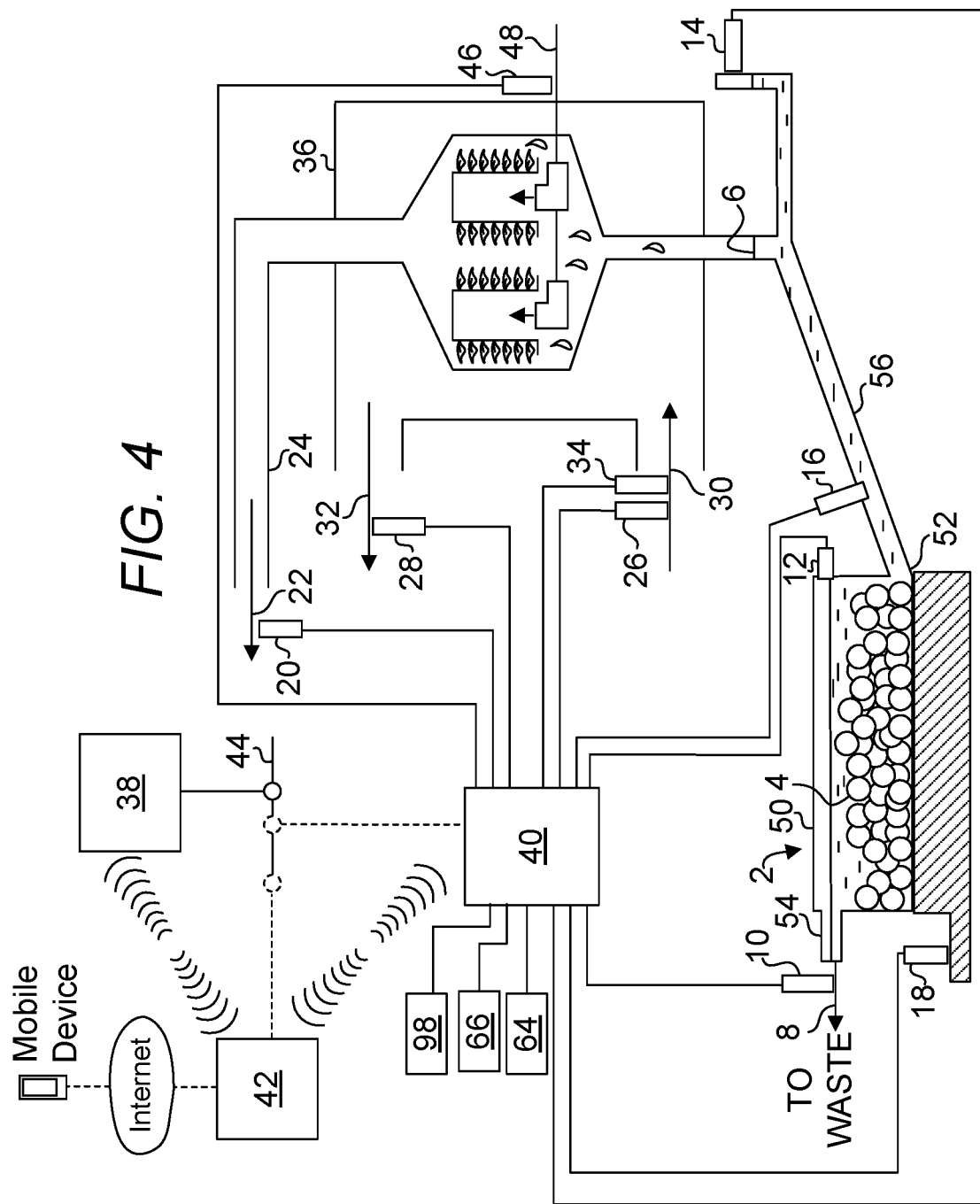
FIG. 4 is a diagram depicting a condensate neutralizer system and the equipment configured for monitoring the health of a furnace which supplies condensate neutralized in the condensate neutralizer system.

FIG. 2 is a diagram depicting a condensate neutralizer system and the equipment configured for monitoring the health of a tank water heater 36 which supplies condensate neutralized in the condensate neutralizer system 2. FIG. 3 is a diagram depicting a condensate neutralizer system and the equipment configured for monitoring the health of a boiler water heater 36 which supplies condensate neutralized in the condensate neutralizer system 2. FIG. 4 is a diagram depicting a condensate neutralizer system and the equipment configured for monitoring the health of a furnace 36 which supplies condensate neutralized in the condensate neutralizer system 2. Although the condensate generating devices 36 shown in FIGS. 1-4 may be configured differently, the health of each device 36 can be monitored based on using the same set of sensors disclosed for FIG. 1 configured for their respective specific medium. The medium used in the tankless, tank and boiler heaters is a liquid, e.g., water while the medium used in the furnace is gas, e.g., air.

Figure 5:
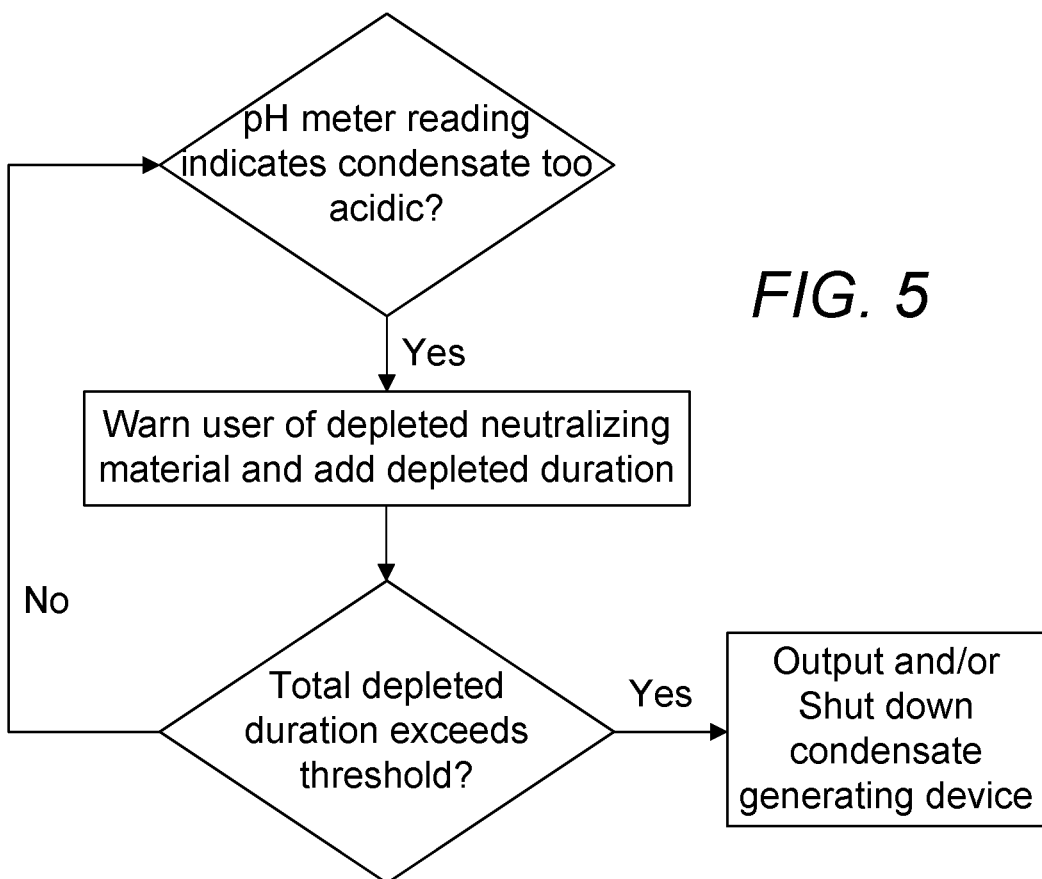
FIG. 5 is a flow diagram depicting a method used for alerting a stakeholder of a depleting condensate neutralizing material condition.

In one embodiment as shown in FIGS. 1-4, the condensate neutralizer system further includes a safety monitoring system configured for monitoring the safety of at least one stakeholder of the condensate generating device. In one embodiment, the safety monitoring system includes a gas detector 64. In another embodiment, the safety monitoring system includes a carbon monoxide (CO) detector 66. Upon detecting a gas (or fuel) leak and/or the presence of carbon monoxide, the gas detector 64 and/or carbon monoxide detector 66 are/is configured to shut down the condensate generating device and report such a gas leak and/or presence of carbon monoxide to at least one stakeholder such that proper actions can be taken by the at least one stakeholder. FIG. 5 is a flow diagram depicting a method used for alerting a stakeholder of a depleting condensate neutralizing material condition. The pH measurement is configured to be compared to a pre-determined pH level within the controller and if the pH measurement indicates an acidity level that is lower than the pre-determined pH level, an output is effected. In one embodiment, the pre-determined pH level is from about 4 to about 5.5. In another embodiment, the pre-determined pH level is from about 4 to about 5.5 and the pH measurements indicate a pH level that is sustained for over about 5 minutes. Referring back to FIGS. 1-4, in one embodiment, the output is a warning communicated to a stakeholder of the condensate neutralizer system from controller 40 via, e.g., the router 42 and the internet and any mobile devices, e.g., mobile phone or pad, etc. In another embodiment, the output is a delivery of replenishment to a stakeholder of the condensate neutralizer system 2. If the stakeholder continues to ignore the warning, i.e., if the level sensor 12 fails to detect a replenishment, i.e., the level continues to be low after an extended amount of time, the stakeholder has an option to instruct controller 40 to issue a shutdown command to the controller 38 such that the "depleting neutralizing material" condition can be communicated as a fault of the condensate generating device 36 which may garner greater attention to correct this condition.

Figure 6:
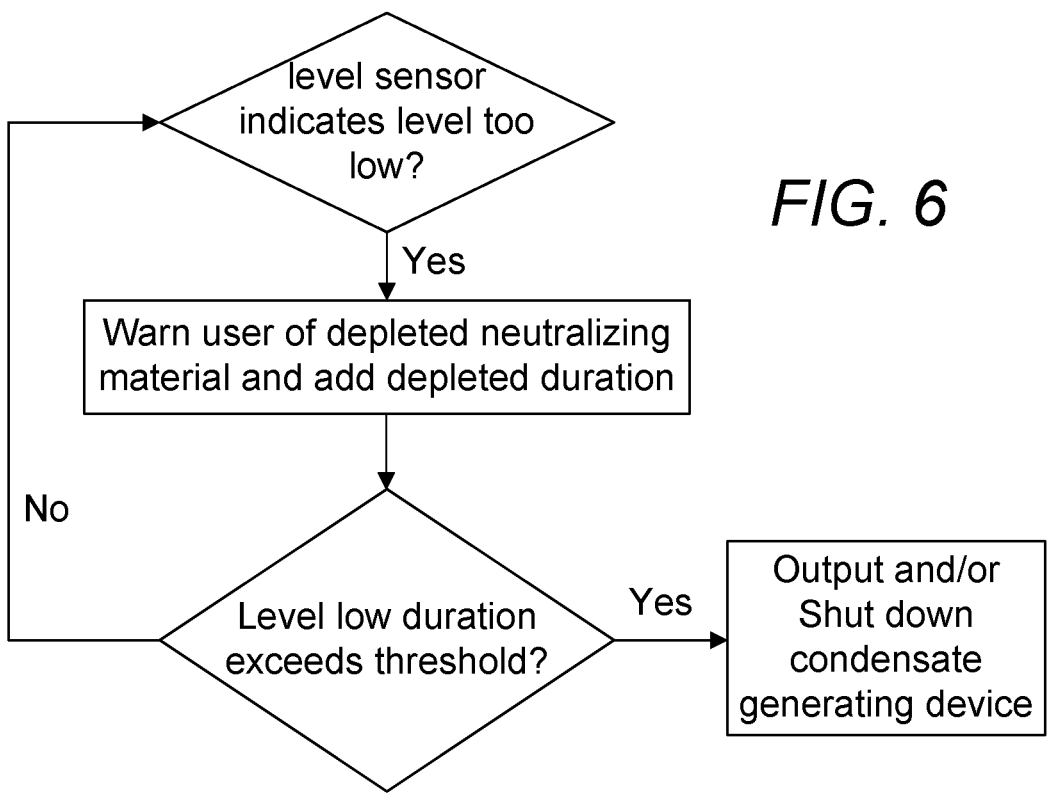
FIG. 6 is a flow diagram depicting a method used for alerting a stakeholder of a depleting condensate neutralizing material condition.

FIG. 6 is a flow diagram depicting a method used for alerting a stakeholder of a depleting condensate neutralizing material condition. The level sensor 12 is configured for indicating the level of the condensate neutralizing material contained within the container 50. The indicated level is configured to be compared to a pre-determined material level and if the indicated level is determined to be lower than the pre-determined material level, an output is effected. Again, the output can be actions identical to those disclosed for FIG. 5.

Figure 7:
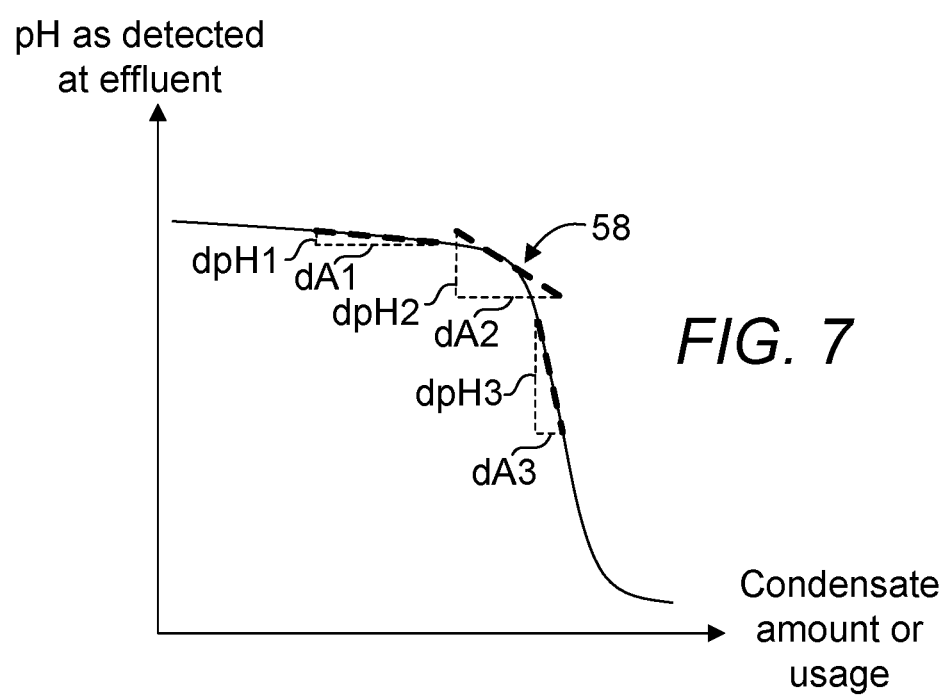
FIG. 7 is a diagram showing the quality of condensate with respect to the amount of condensate which has gone through an amount of condensate neutralizing material.

FIG. 7 is a diagram showing the quality of condensate with respect to the amount of condensate which has gone through an amount of condensate neutralizing material. In lieu of the level of pH that may be used to indicate a depleting condensate neutralizing material condition, an accelerating drop in pH may be used to detect this condition. In one instance, an accelerating drop in pH indicated as portion 58 (or a "knee") may be used to provide an early indication that the depletion of condensate neutralizing material is imminent. As more condensate neutralizing material is depleted as more condensate is being generated, there is less condensate neutralizing material that is exposed to the generated condensate in order to neutralize it. For instance, a normal operating condition of a condensate neutralizer system is a condition where the drop of pH as detected by a pH meter in a condensate neutralizer system is gradual, i.e., the change in pH or dpH1 is small compared to an amount of generated condensate dA1 or time. In other words the ratio dpH1/dA1 is small. As the condensate neutralizing material in the container is getting depleted, the change in pH or dpH2 over an amount of generated condensate dA2 becomes larger. The amount of neutralizing material available for neutralizing reactions with the condensate becomes small enough that it is now insufficient to "keep up." If the condensate neutralizing material is not replenished, the change in pH or dpH3 becomes even larger over an amount of generated condensate dA3. In detecting a "knee," one need not be concerned with microscopic or localized pH drop and recovery patterns as disclosed elsewhere herein. In one example, a pH drop of about 2 over a period of about 5 minutes indicates that a "knee" has occurred and that the condensate neutralizing material will soon need to be replenished or the condensate that continues to be generated will not be neutralized properly. A reminder for informing a stakeholder may be automatically generated or an order for replenishment of condensate neutralizing material may be automatically placed as disclosed elsewhere herein.

Figure 7A:
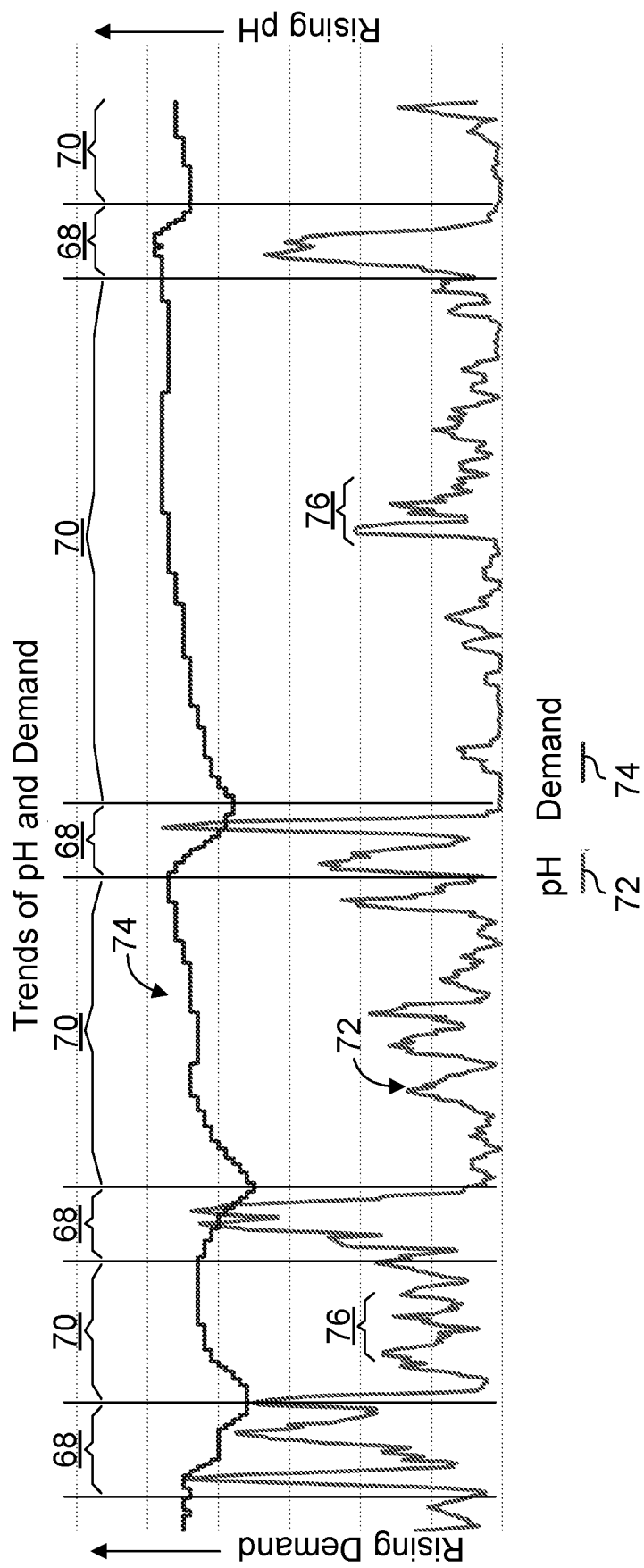
FIG. 7A is a sample data set depicting pH responses of a condensate neutralizer system as condensate generated from a condensate neutralizing device flows through condensate neutralizing material.

FIG. 7A is a sample data set depicting pH responses of a condensate neutralizer system as condensate generated from a condensate neutralizing device flows through condensate neutralizing material. pH readings 74 are collected over this period of time and plotted along with operational setting 72 of a condensate generating device producing a condensate stream that is being neutralized by a condensate neutralizing material in a container from which this pH readings are obtained. This set of data can be thought of as a set of data that is collected in the region prior to the "knee" in FIG. 7 or the region where the slope is dpH1/dA1. The vertical axis represents pH values while the horizontal axis represents time. Note that the pH readings 74 exhibit two distinct patterns as related to demand, operational setting, intensity or firing rate of the condensate generating device, e.g., a hot water heater. In a period labelled 68, pH readings appear to decrease, a sign that condensate is being generated. This period coincides with an increased demand or intensity of the condensate generating device, e.g., increased power output (or turning on) of the condensate generating device, e.g., in this case, measured in BTU/hr. In a period labelled 70, pH readings appear to increase, a sign that condensate is being neutralized. This period coincides with a decreased demand of the condensate generating device, e.g., decreased power output (or turning off) of the condensate generating device. If the pH readings return to the prior level or a level approximate that of the prior level, it is said that there is sufficient condensate neutralizing material to neutralize the generated condensate. Over time, pH readings become incapable of returning to the level prior to the generation of the condensate as the condensate neutralizing material is getting depleted. When condensate is generated and drained into the condensate neutralizer system, the region in which pH readings are taken becomes more acidic in a period labelled 68. When condensate ceases to be generated and drained into the condensate neutralizer system, the region in which pH readings are taken becomes less acidic in a period labelled 70. In one example, a pH drop of about 1 over about 10 minutes indicates that the demand for a condensate generating device is high while a pH rise of about 1 over about 10 minutes indicates that the demand for the condensate generating device is low. In one embodiment, the mechanism shown in FIG. 5 is the only mechanism used to detect a need for replenishment of the condensate neutralizing material. In another embodiment, the detection of a "knee" is the only mechanism used to detect a need for replenishment of the condensate neutralizing material. In yet another embodiment, both the mechanism shown in FIG. 5 and the detection of a "knee" are used to bolster the confidence that a need for replenishment of the condensate neutralizing material has been detected. In other words, if both conditions occur simultaneously, the composite condition serves as a confirmation that it is highly likely that the condensate neutralizing material is being exhausted imminently. Referring back to FIG. 7A, it shall be noted that at certain operational settings (e.g., at portions 76), there is insufficient amount of condensate generated to cause a discernible drop in pH. The severity of the drops and rises due to the turn-on and turn off cycles or production of condensate is a function of the size of the neutralizer system. A large neutralizer system capable of holding a large amount of condensate neutralizer materials will produce smaller drops and rises in pH while a small neutralizer system capable of holding a limited amount of condensate neutralizer materials will produce larger drops and rises in pH.

In a water heater, space heating furnace or another condensate generating device, a flow sensor and one or more additional sensors may be used to gauge the amount of usage of the condensate generating device for maintenance purposes. For example, after delivering heated air of a certain volume or for a certain duration, a space heating furnace may be required to be serviced where the air filter may need to be replaced. Applicants discovered that the occurrence and magnitude of the drops in pH in a condensate neutralizer system closely represent the operational settings of the condensate generating device which produces the condensate. Therefore, in addition to providing an estimate of usage of the condensate neutralizing materials and the schedule for getting the materials replaced, the data obtained from a pH meter can be used to estimate the usage of the condensate generating device and its maintenance schedule. On condensate generating devices which are not equipped with appropriate equipment for estimating their usage, a present condensate neutralizer system can be used for estimating such usage. Therefore, maintenance can be performed on demand rather than a fixed schedule which either requires that a part be serviced or replaced too early or too late.

Figure 8:
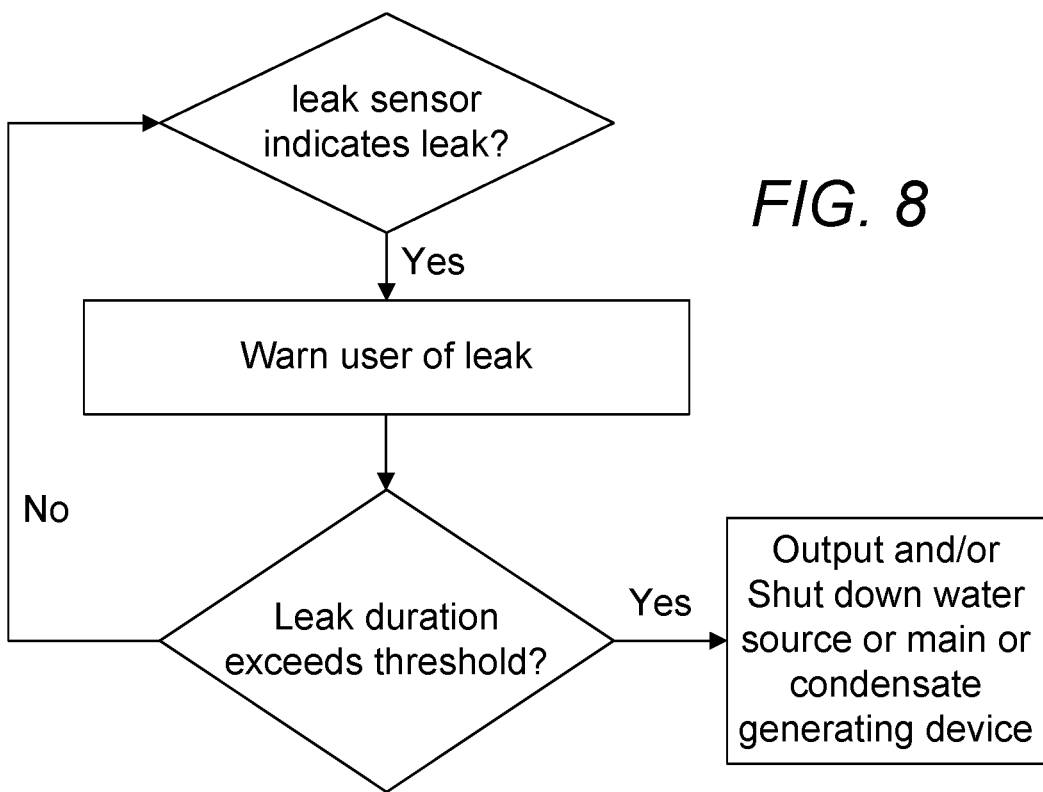
FIG. 8 is a flow diagram depicting a method used for alerting a stakeholder of a leakage in a condensate drainage system.

FIG. 8 is a flow diagram depicting a method used for alerting a stakeholder of a leakage in a condensate drainage system and/or the condensate generating device. Referring to FIGS. 1-4 and 8, the condensate neutralizer system 2 further includes a leak detector 18 configured for indicating a leak from the container 50 or a leak from the condensate generating device, wherein if a leak is detected, an output is effected. The output can be a shutdown action of the water source or main which feeds into the condensate generating device and/or the condensate generating device itself.

Figure 9:
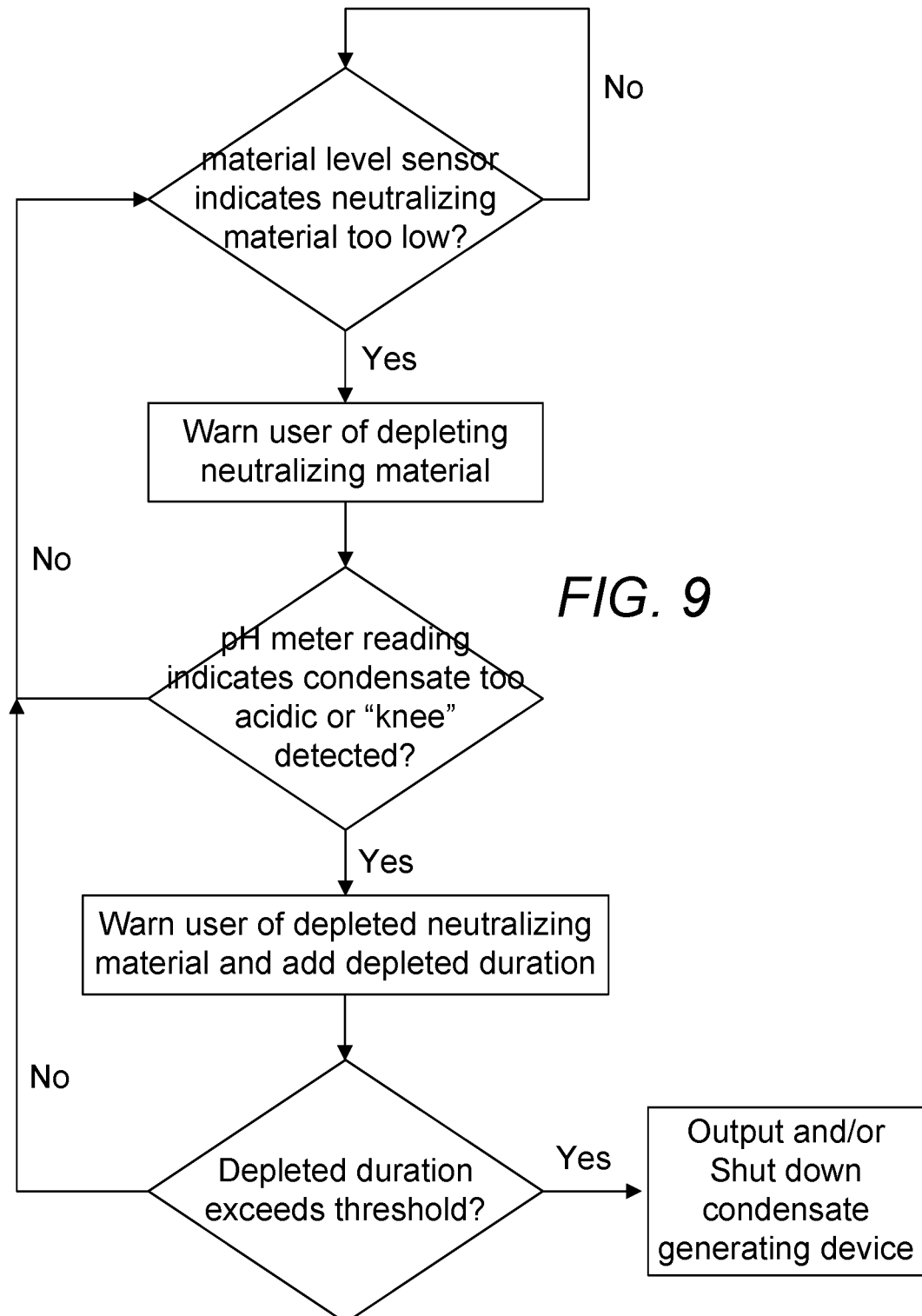
FIG. 9 is a flow diagram depicting a method used for alerting a stakeholder of a depleting condensate neutralizing material condition.

FIG. 9 is a flow diagram depicting a method used for alerting a stakeholder of a depleting condensate neutralizing material condition. Referring to FIGS. 1-4 and 9, the condensate neutralizer system 2 includes a level sensor 12 configured for indicating the level of the condensate neutralizing material contained within the container, wherein the indicated pH level is configured to be compared to a pre-determined material level and if the indicated pH level is determined to be lower than the pre-determined material level, an output is effected. Another condition which further indicates a depleting condensate neutralizing material is the occurrence of a "knee." Again, the output can be actions identical to those disclosed for FIG. 5. As shown in FIG. 9, a pH check can be combined with the level check to provide an output that indicates a higher urgency to replenish the condensate neutralizing material.

Figure 10:
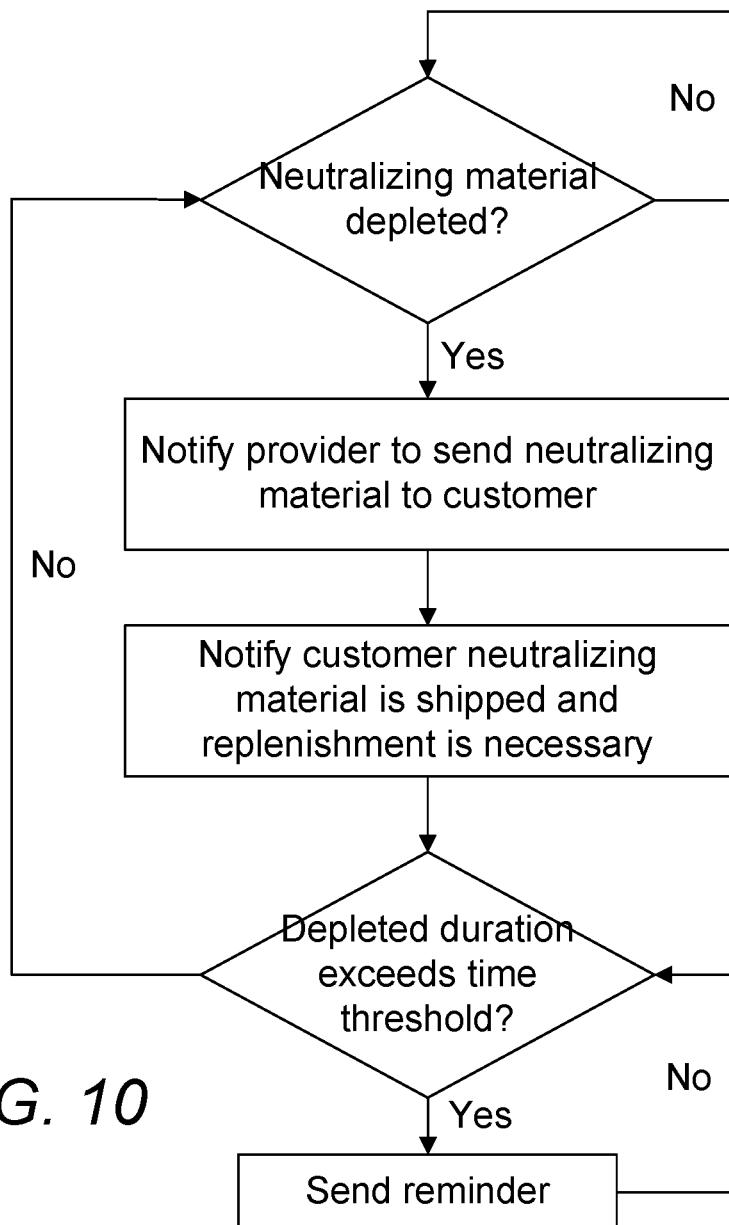
FIG. 10 is a flow diagram depicting method used for alerting a stakeholder of a depleting condensate neutralizing material condition and steps taken to facilitate replenishment of condensate neutralizing material.

FIG. 10 is a flow diagram depicting a method used for alerting a stakeholder of a depleting condensate neutralizing material condition and steps taken to facilitate replenishment of condensate neutralizing material. The stakeholder is given time to replenish the depleting material. However, if the depleting condition is not corrected within this time allowance, an output can be actions that indicate a higher urgency to replenish the condensate neutralizing material is provided.

Figure 11:
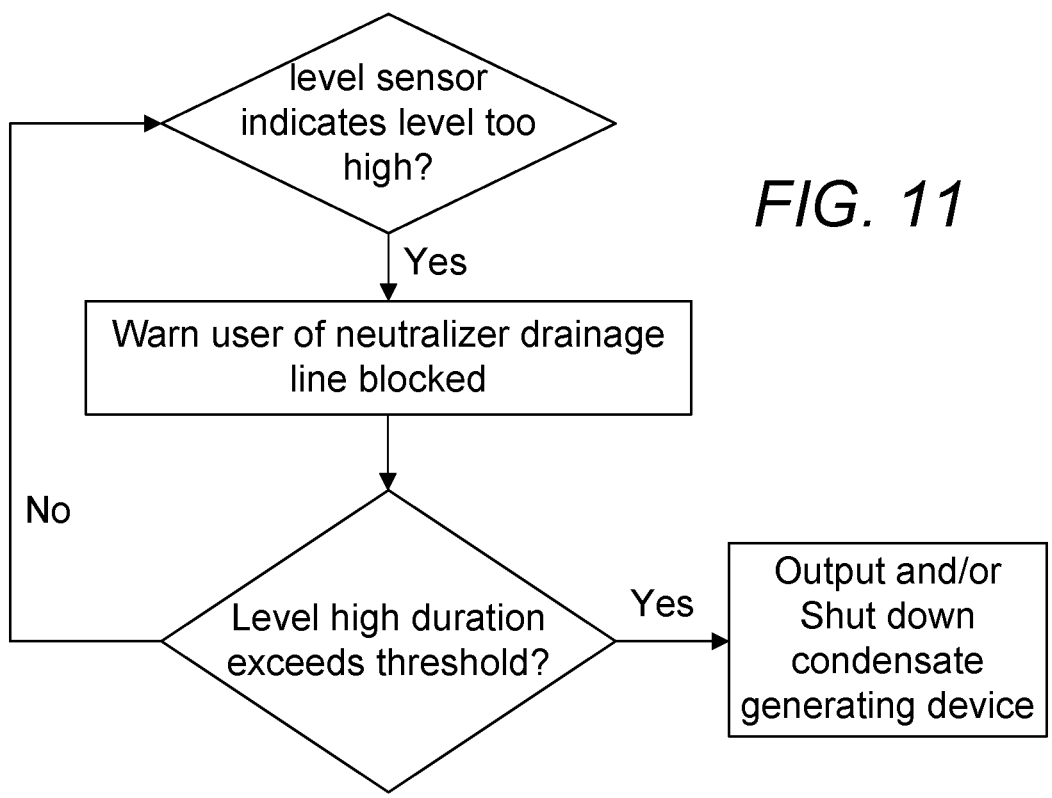
FIG. 11 is a flow diagram depicting a method used for alerting a stakeholder of a blockage in a condensate neutralizer system.

FIG. 11 is a flow diagram depicting a method used for alerting a stakeholder of a blockage in a condensate drainage system. Referring to FIGS. 1-4 and 11, the condensate is communicated to the container 50 via a drainage line 56 and the condensate neutralizer system further includes a level sensor 14 configured for indicating the level of the condensate in the drainage line and the indicated level is configured to be compared to a pre-determined level and if the indicated level is determined to be higher than the pre-determined level, an output is effected. It shall be noted that the level sensor 14 is mounted at an elevation that is normally higher than the condensate level. However if a backup has occurred, the condensate level will continue to rise, eventually tripping the level sensor 14. The output can be actions that indicate that the drainage will need to be checked for blockage.

Figure 12:
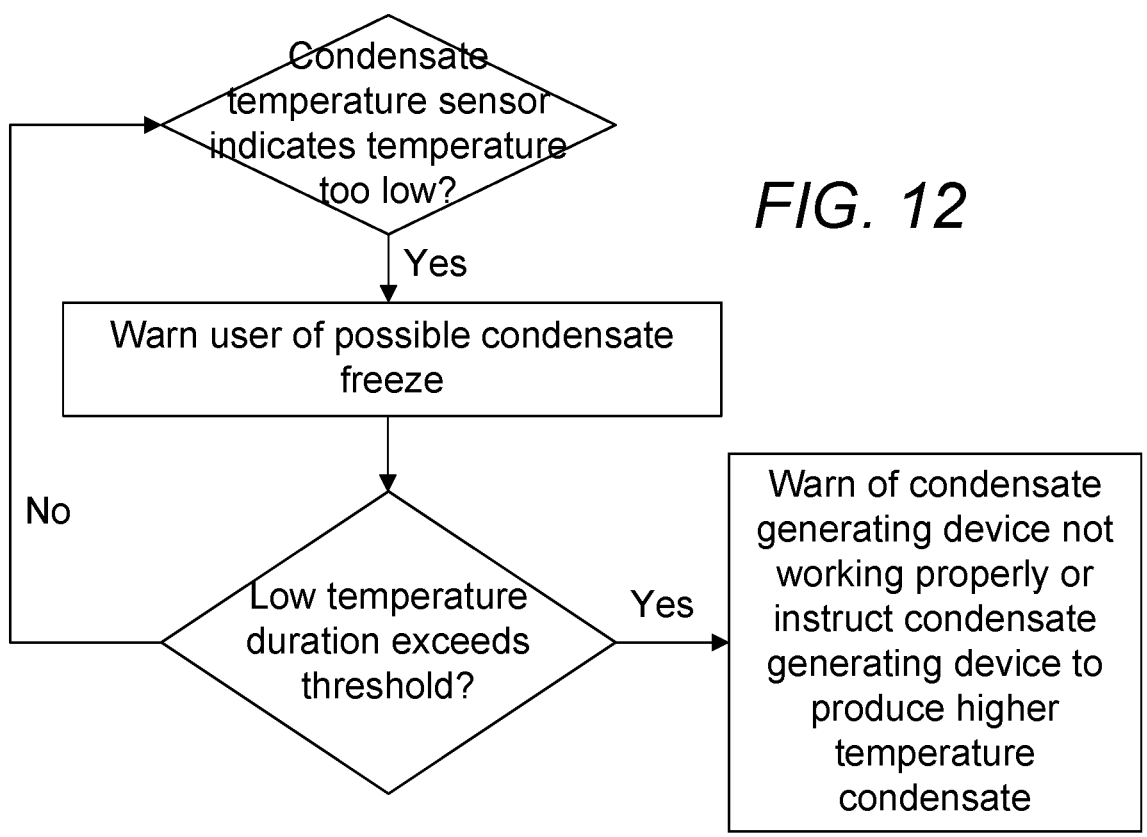
FIG. 12 is a flow diagram depicting a method used for alerting a stakeholder of an abnormality in a condensate neutralizer system.

FIG. 12 is a flow diagram depicting a method used for alerting a stakeholder of an abnormality in a condensate neutralizer system. Referring to FIGS. 1-4 and 12, the condensate neutralizer system 2 further includes a temperature sensor 16 configured for indicating a temperature of the condensate at the inlet of the container 50, wherein the indicated temperature is configured to be compared to a pre-determined temperature and if the indicated temperature is determined to be lower than the pre-determined temperature, an output is effected. The output can be actions that indicate that the condensate generating device will need to be checked for its proper operation or the condensate generating device can be instructed to produce higher temperature condensate.

Figure 13:
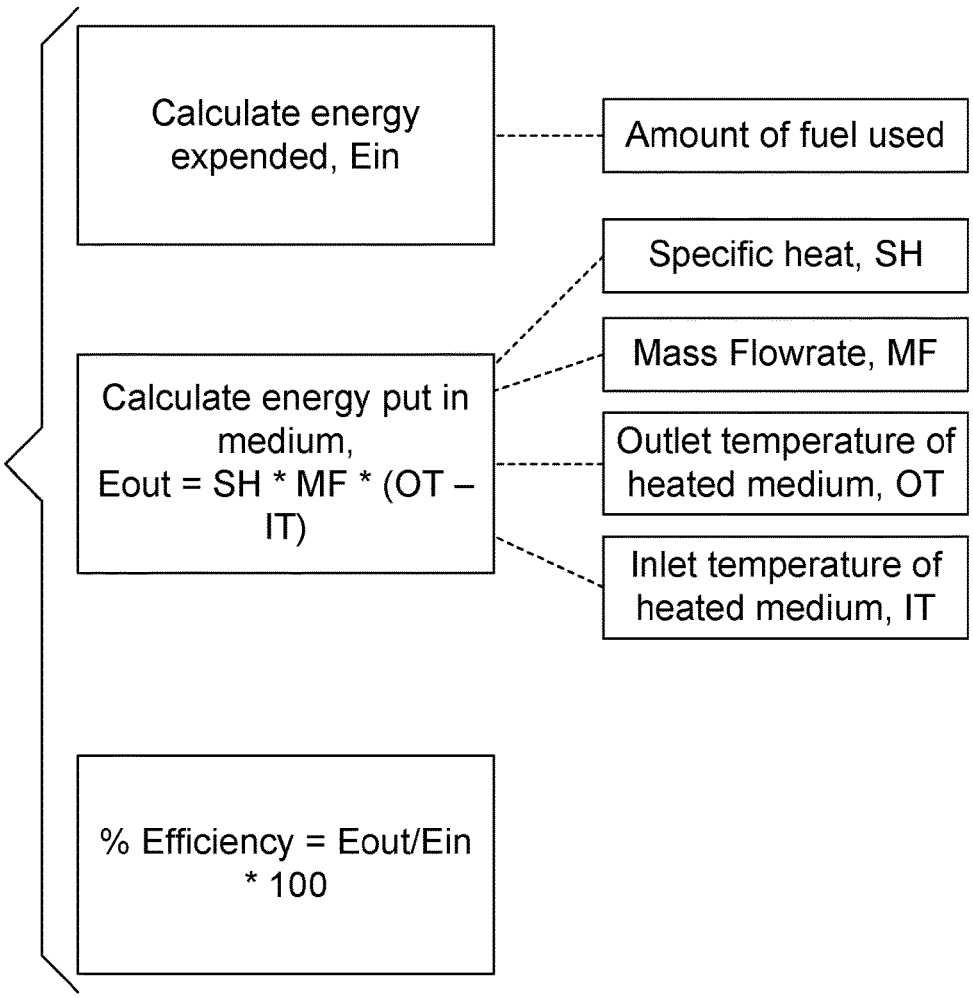
FIG. 13 is a diagram depicting the factors considered in calculating the efficiency of a condensate generating device.

FIG. 13 is a diagram depicting the factors considered in calculating the efficiency of a condensate generating device. Referring to FIGS. 1-4 and 13, the condensate neutralizer system further includes a health monitoring system configured for monitoring the health of the condensate generating device. In one embodiment, the health monitoring system includes:

(a) a first temperature sensor configured for indicating the temperature of a medium at an inlet of the condensate generating device;

(b) a second temperature sensor configured for indicating the temperature of the medium at an outlet of the condensate generating device;

(c) a first flowrate sensor configured for indicating the flowrate of the medium through the condensate generating device, wherein an energy output quantity is calculated by deriving the amount of energy used in raising the temperature of the medium at the inlet of the condensate generating device to the temperature of the medium at the outlet of the condensate generating device in a period of time given the flowrate of the medium through the condensate generating device in the period of time; and (d) a second flowrate sensor configured for indicating the flowrate of a fuel supply to the condensate generating device that causes the difference between the temperature of the medium at the outlet and the inlet of the condensate generating device, wherein an energy input quantity is calculated by deriving the amount of energy put into the condensate generating device from the flowrate of the fuel supply over the period in which the temperature of the medium is raised from the temperature of the medium at the outlet of the condensate generating device and temperature of the medium at the outlet of the condensate generating device, wherein a ratio of the energy output quantity to the energy input quantity is compared to a pre-determined efficiency and if the pre-determined efficiency is greater than the ratio by a pre-determined amount, an output is effected. The output can be actions that indicate that the condensate generating device is operating at an efficiency that is close to an expected efficiency.

It can then be summarized that the computed energy input into the condensate generating device is energy per unit of fuel multiplied by units of fuel and the energy used to raise medium (water) temperature is mass flowrate MF multiplied by the difference between the outlet temperature OT and inlet temperature IT and multiplied by the specific heat SF of the medium (water).

Figure 14:
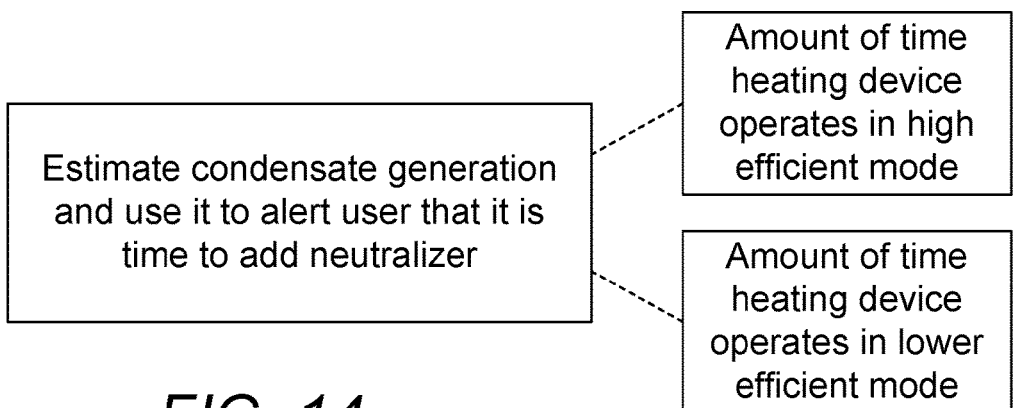
FIG. 14 is a diagram depicting the factors considered in estimating the consumption of condensate neutralizing material.

FIG. 14 is a diagram depicting the factors considered in estimating the consumption of condensate neutralizing material. Referring to FIGS. 1-4 and 14, the controller is further configured to estimate the amount of usage of the condensate neutralizing material by summing:

(a) a first amount of generated condensate, wherein the first amount of generated condensate is calculated by multiplying a first condensate generating rate corresponding to rate at which condensate is generated when the condensate generating device operates in a high efficiency mode and the amount of time the condensate generating device operates in the high efficiency mode; and (b) a second amount of generated condensate, wherein the second amount of generated condensate is calculated by multiplying a second condensate generating rate corresponding to rate at which condensate is generated when the condensate generating device operates in a lower efficiency mode and the amount of time the condensate generating device operates in the lower efficiency mode.

Figure 15:
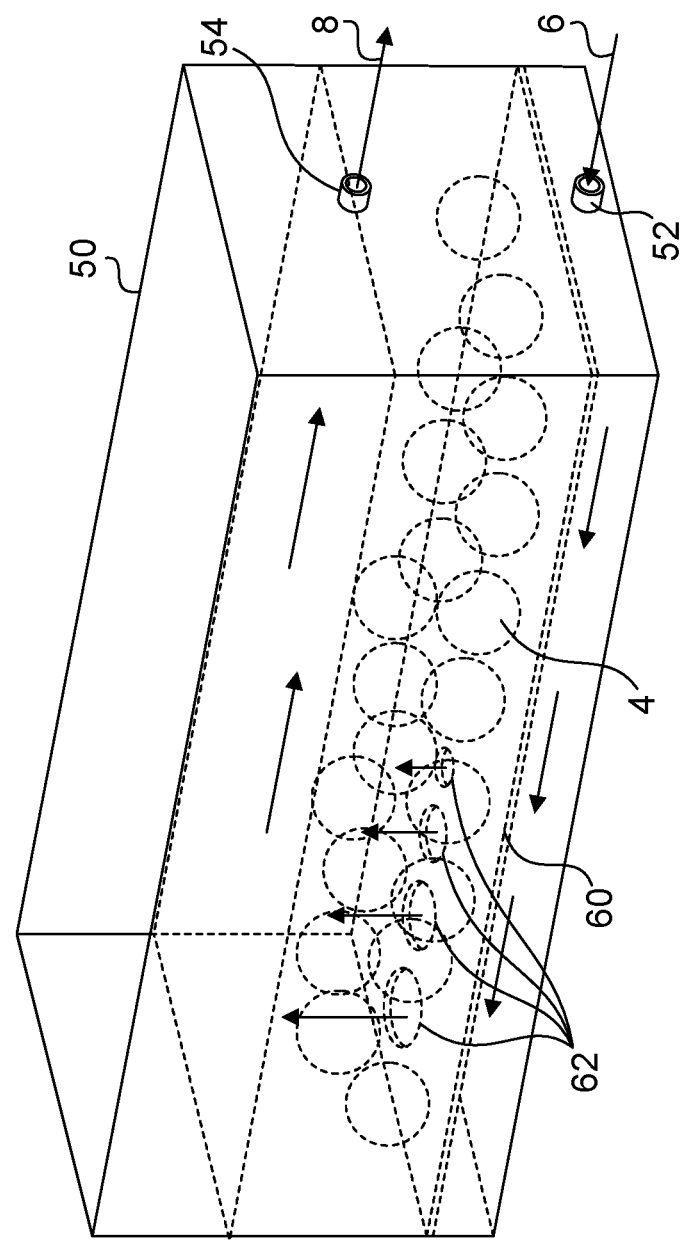
FIG. 15 is a partially transparent top perspective view of one embodiment of a condensate neutralizer system.

It can then be summarized that the computed cumulative condensate generated=$X*tx+Y*ty$
where:
tx=duration in which condensate generating device operates in high efficiency mode
ty=duration in which condensate generating device operates in lower efficiency mode
X=amount of condensate generated per unit time when condensate generating device operates in high efficiency mode
Y=amount of condensate generated per unit time when condensate generating device operates in lower efficiency mode FIG. 15 is a partially transparent top perspective view of one embodiment of a condensate neutralizer system. Disclosed is a container 50 including an inlet 52 and an outlet 54 connected to the container 50. In use, pre-treated condensate 6 is received via the inlet 52 into the container 50 and post-treated condensate 8 is discharged via the outlet 54 from the container 50. A baffle 60 divides the container into a lower space or compartment and an upper space or compartment. Communication between materials of the two compartments occurs only through the apertures 62 disposed on the baffle 60. As shown in FIG. 15, four apertures 62 of varying sizes are disposed on baffle 60 with the aperture 62 closest to the inlet 52 being the smallest and the aperture 62 farthest from the inlet 52 being the largest. As the apertures 62 are disposed on the far end of the baffle 60 from the inlet 52, upon entering the container 50 via the inlet 52 and flowing through the apertures 62, the pre-treated condensate 6 is forced through condensate neutralizing materials 4 before exiting via outlet 54. As the pre-treated condensate enters the lower compartment, it is more strongly drawn to the far end from the inlet 52 as the apertures are larger. Therefore, the condensate is afforded appropriate dwell time in the upper compartment while exposed to the condensate neutralizing materials 4. The baffle 60 need not be constructed as a single unit with the container. In one embodiment, the baffle 60 is a member formed in a shape of the cross section of the space of the container and removably secured in place. The baffle 60 may be hingedly connected to the container 50 or capable of being completely removed from the container 50. Condensate neutralizing materials 4 may be made available in perforated bags 112, nettings, etc., or may come unpackaged. In one embodiment, there is further provided a basket configured to be disposed within the upper space to hold condensate neutralizing materials 4 in order to ease replacement or replenishment of the condensate neutralizing materials. In replenishing the condensate neutralizing materials, the basket of depleting condensate neutralizing materials may simply be removed and replaced with a fresh basket containing such unused condensate neutralizing materials. The condensate neutralizing materials are not required to be further contained in a perforated bag or netting as they are already contained in a basket, further reducing the amount of work associated with replenishing a neutralizer.

In yet another embodiment, a heat or BTU meter is provided and a real time or up-to-date energy pricing is obtained via internet connection. As energy usage is available from this meter and energy pricing is available, a stakeholder of the condensate generating device can be notified of the cost of operating the condensate generating or another device. The period/s yielding the least cost can then be identified such that the condensate generating or another device may be operated at these periods.

In yet another embodiment, boiler cycles are used to estimate whether a condensate generating device operated properly. The frequency or duration of operation of a condensate generating device directly corresponds to the amount of heat generated which can be estimated by the volume of a medium heated to a temperature by the condensate generating device. If the heat output of a condensate generating device is not commensurate with the boiler cycles reported, at least one stakeholder of the condensate generating device is notified.

Figure 16:
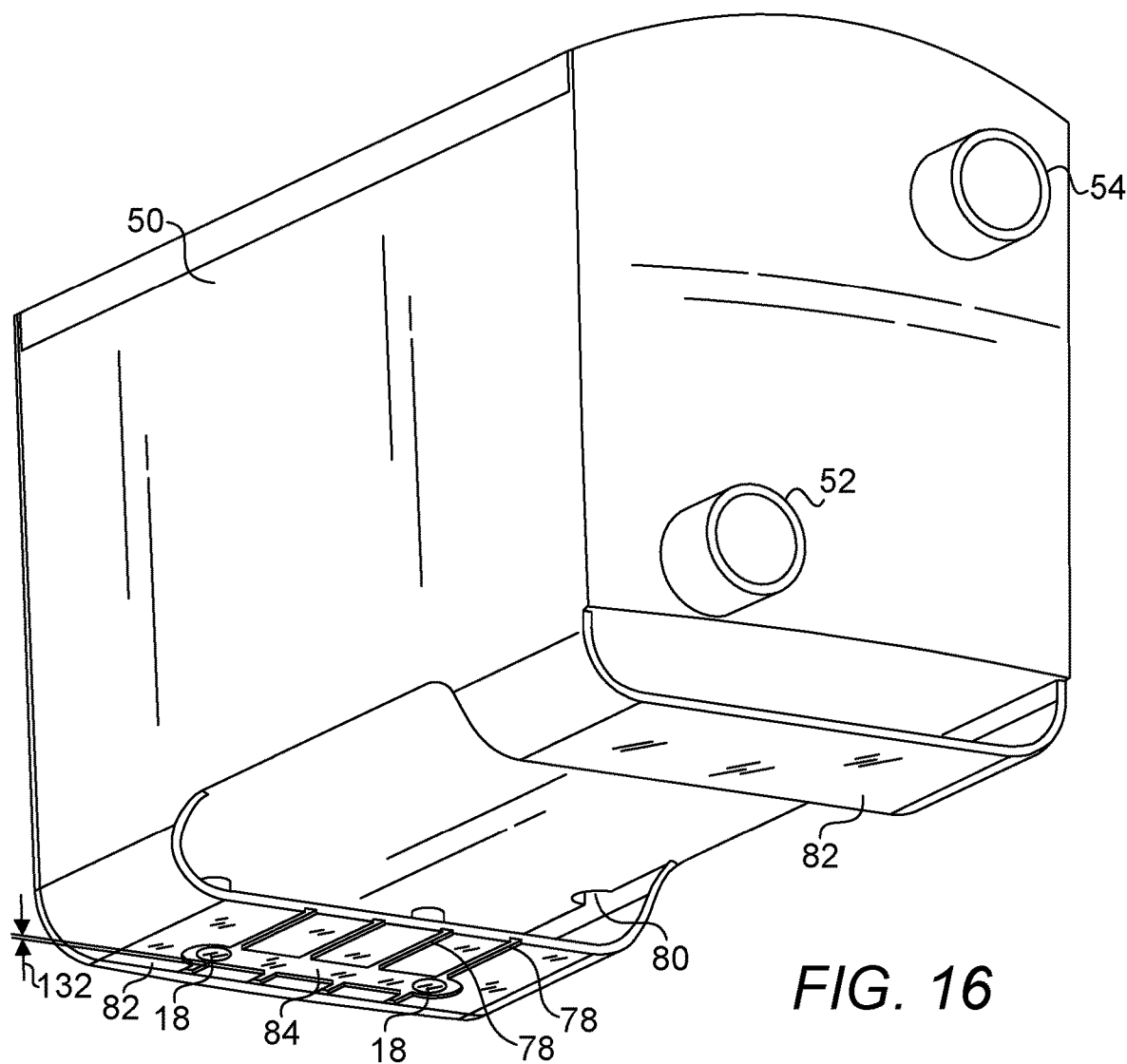
FIG. 16 is a bottom rear perspective view of one embodiment of a condensate neutralizer device.
Figure 17:
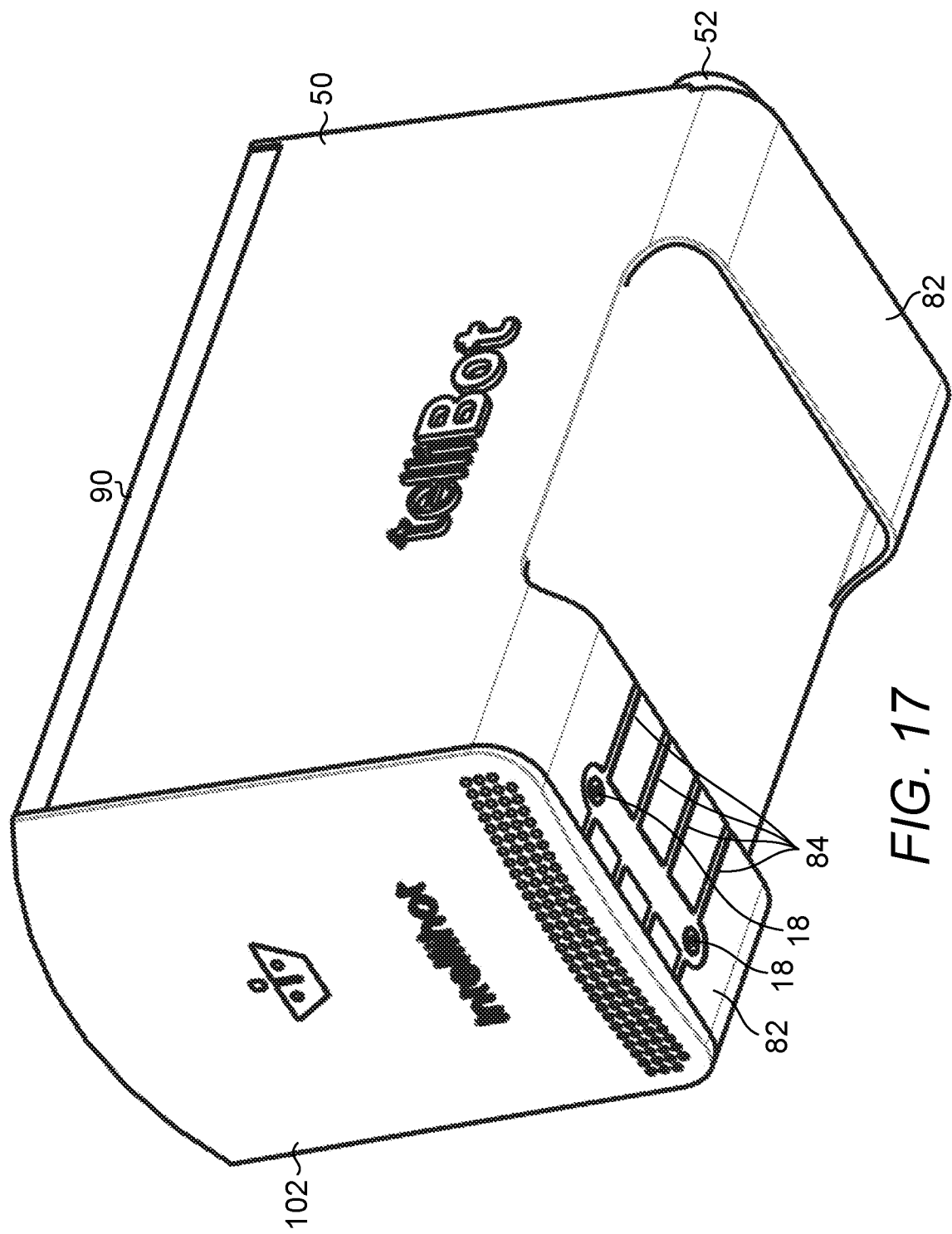
FIG. 17 is a bottom front perspective view of one embodiment of a condensate neutralizer device.

FIG. 16 is a bottom rear perspective view of one embodiment of a condensate neutralizer device. FIG. 17 is a bottom front perspective view of one embodiment of a condensate neutralizer device. The condensate neutralizer device includes a generally rectangular container 50 supported on two supports 82, a lid 90 which allows access to the interior of the condensate neutralizer device and a front cover 102 which protects a controller 40 disposed within the front portion of the condensate neutralizer device. The lid 90 is preferably one which is hingedly attached to container 50 such that it cannot be misplaced. In the embodiment shown, a leak detector 18 is integrally built with the condensate neutralizer device. However, a leak detector 18 may be disposed on a separate structure. In the embodiment shown, two leak detectors 18 are provided to increase the opportunity that a leak can be detected although only one probe is required. As a condensate neutralizer device is already used in an environment in which a leakage, e.g., from a water heater can occur, it is practicable to include a leak detector which can not only detect a condensate leak but also a water leak (e.g., due to a leaky water heater) or detect a liquid collection (e.g., due to a faulty sump pump) which can cause a drainage backup which leads to a flooded basement. In use, the container 50 is preferably disposed at a level leakage can be detected, i.e., floor of basement of a building or a surface upon which a leakage can collect etc. In use, the condensate neutralizer device is preferably disposed on the floor of a basement with the supports 82 contacting the floor. In the embodiment shown, each support includes a bottom-facing surface having an inverted depression 84 and a plurality of capillaries 78 connected to the inverted depression 84 all of which are disposed on the bottom-facing surface of the container 50. It shall be noted that a surface of the inverted depression 84 or capillary 78 is disposed at a height 132 of, e.g., about 1 mm, a height suitable for capillary actions to occur due to a genuine leak event while insufficient for moisture that collects due to condensation outside of the condensate neutralizer or a small one-time spill just outside of condensate neutralizer to be communicated to the leak detector. Capillary actions occur when any surface within the inverted depression 84 and any one of the capillaries 78 is exposed to the liquid, e.g., water, such that a leak detector 18 disposed within the inverted depression 84 can detect the presence of the liquid within the inverted depression as it is drawn there by one or more capillaries 78 disposed contiguous to the inverted depression. Referring to FIG. 16, when liquids start collecting on the surface upon which the condensate neutralizer device is disposed, the liquids that reach the openings or peripheries of the inverted depression 84 can be quickly drawn to the leak detector 18 within the inverted depression 84. Therefore the chance of early detection of a leak is increased and the amount of time it takes to start detecting a leakage is shortened as each of the leak detectors 18 can detect a thin layer of a liquid and the "reach" of the leak detector is essentially increased by the capillaries 78. It shall also be noted that at least one overflow channel 80 of the container 50 is disposed in the vicinity of the capillaries 78, preferably two, as in the case of the embodiment shown in FIGS. 20-22. Therefore, if a blockage had occurred at the outlet 54 or if a large leak had occurred, e.g., due to a water leak in the condensate generating device, an overflow of the fluid contents of the container 50 will be detected by the leak detector 18, aided in part by capillary action, of the capillaries 78 which tend to draw the overflow fluid contents to the leak detector 18. In one embodiment, an electrical conductivity sensor is provided to detect whether the overflow fluid contents is mostly condensate or water in addition to the leak detector 18. If the overflow fluid contents are determined to be mostly condensate, then the leak may be attributed to a blockage of the outlet of the container. If the overflow fluid contents are determined to be mostly water, then the leak may be attributed to the condensate generating device. In the embodiment shown, the leak detector 18 is capable of detecting the electrical conductivity of the overflow fluid contents in addition to its role in detecting a leak (liquid). There are two parts to the leak detector 18. If a weak pulse is initiated in a first of the two parts, a leak spanning and coming in contact with the two parts will cause the initiated pulse to be detected in a second of the two parts. The magnitude of the pulse indicates the type of liquid the overflow fluid contents. Referring to FIG. 16, it shall be noted that a condensate is received via port 52 and upon treatment, the condensate is configured to exit port 54 as an effluent. It shall be appreciated that although the leak detector 18 is shown coupled with a condensate neutralizer, the leak detection system that encompasses a structure that takes advantage of capillary actions and a leak detector functionally coupled to a controller need not be part of a condensate neutralizer.

Figure 18:
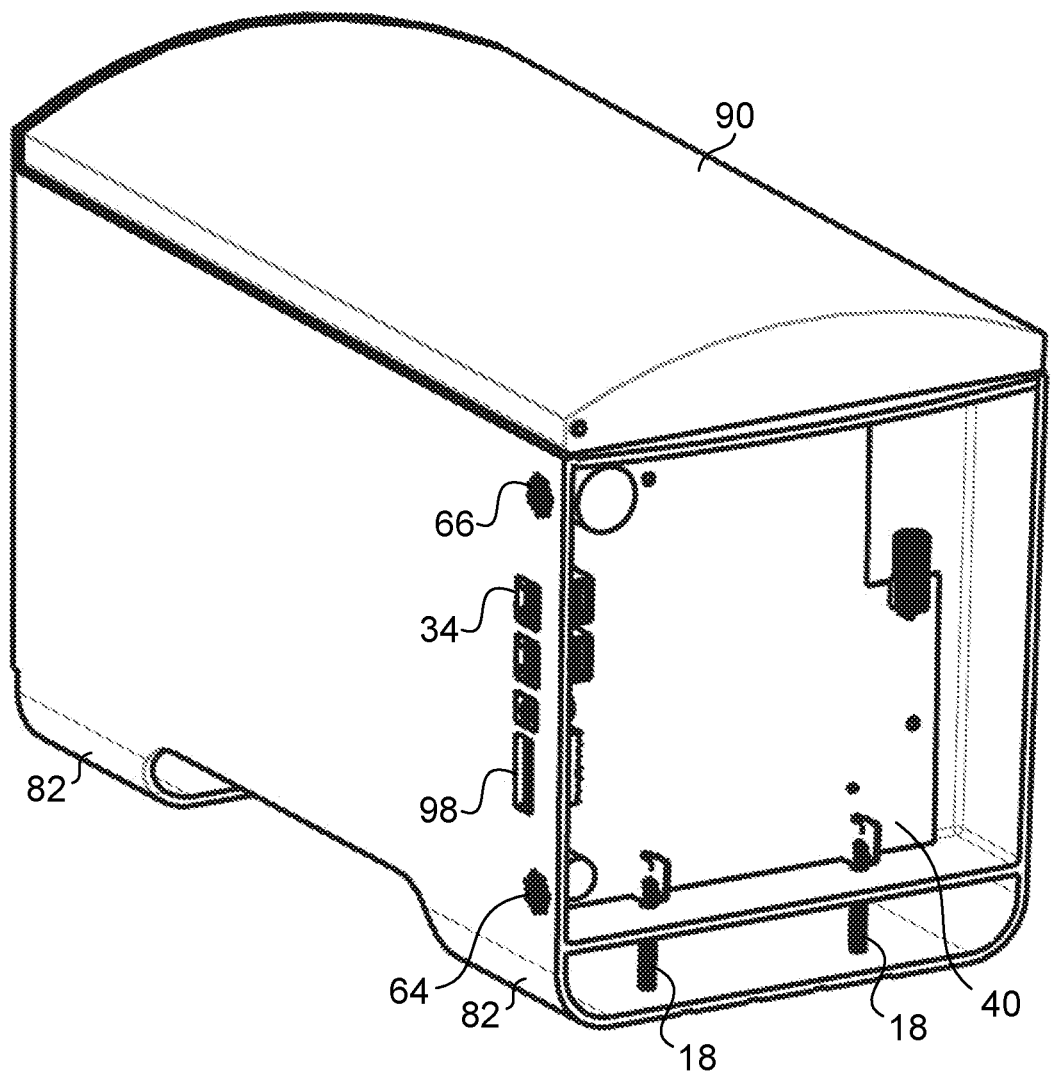
FIG. 18 is a top front view of one embodiment of a condensate neutralizer device.

FIG. 18 is a top front view of one embodiment of a condensate neutralizer device with its front cover removed to reveal a controller 40 that is disposed therein. A carbon monoxide detector 66 and a gas sensor 64 are disposed on a side wall the condensate neutralizer device. Again, Applicants discovered that as a condensate neutralizer device is already used in an environment in which (i) carbon monoxide, e.g., due to incomplete combustion of fossil fuel, e.g., propane and natural gas; and (ii) gas, e.g., due to leakage of fuel supply from a heating device, can be present, combining detectors for such gases removes the need for making such detectors available individually or separately.

Figure 19:
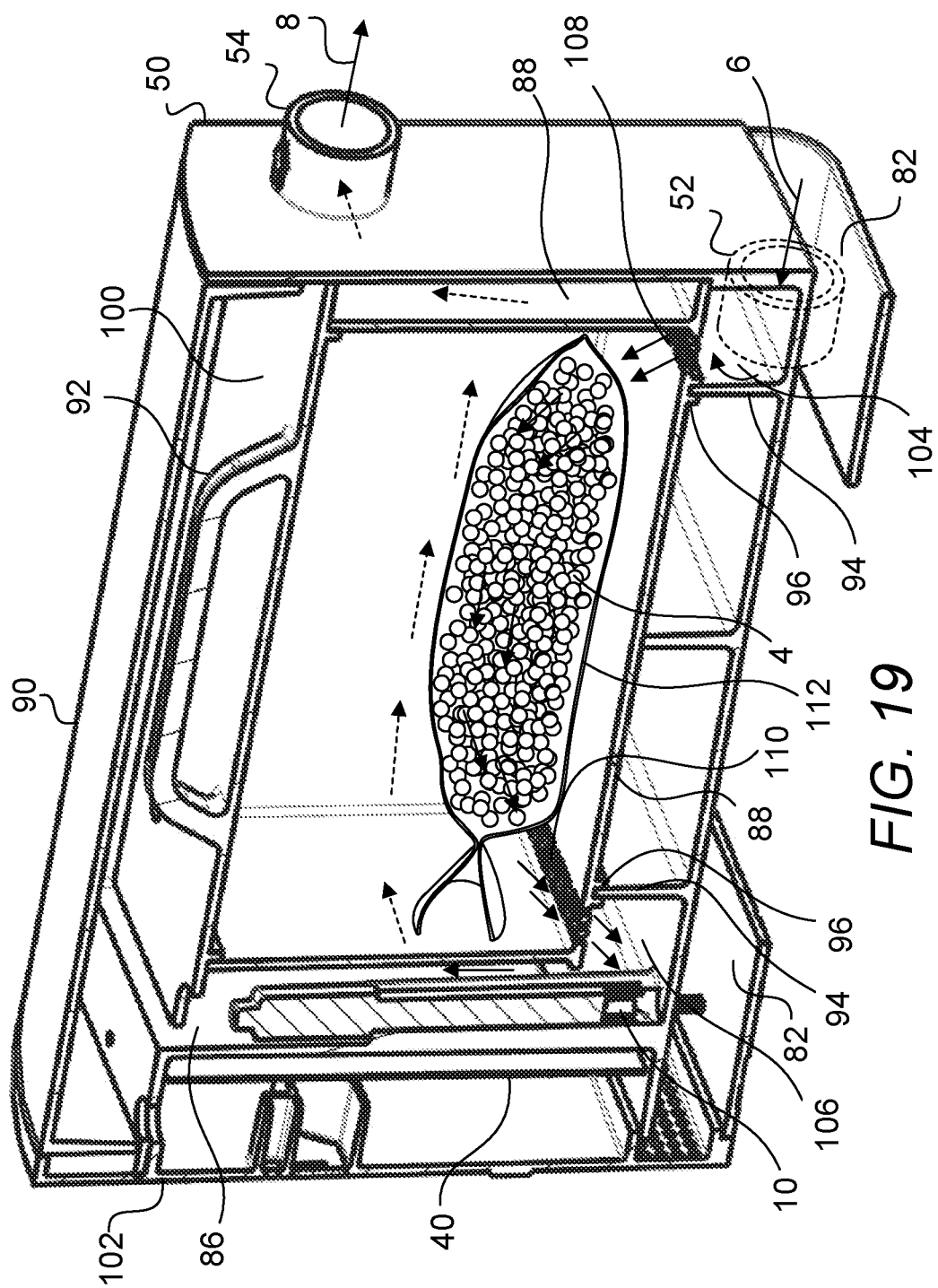
FIG. 19 is a cross-sectional view of one embodiment of a condensate neutralizer device.
Figure 20:
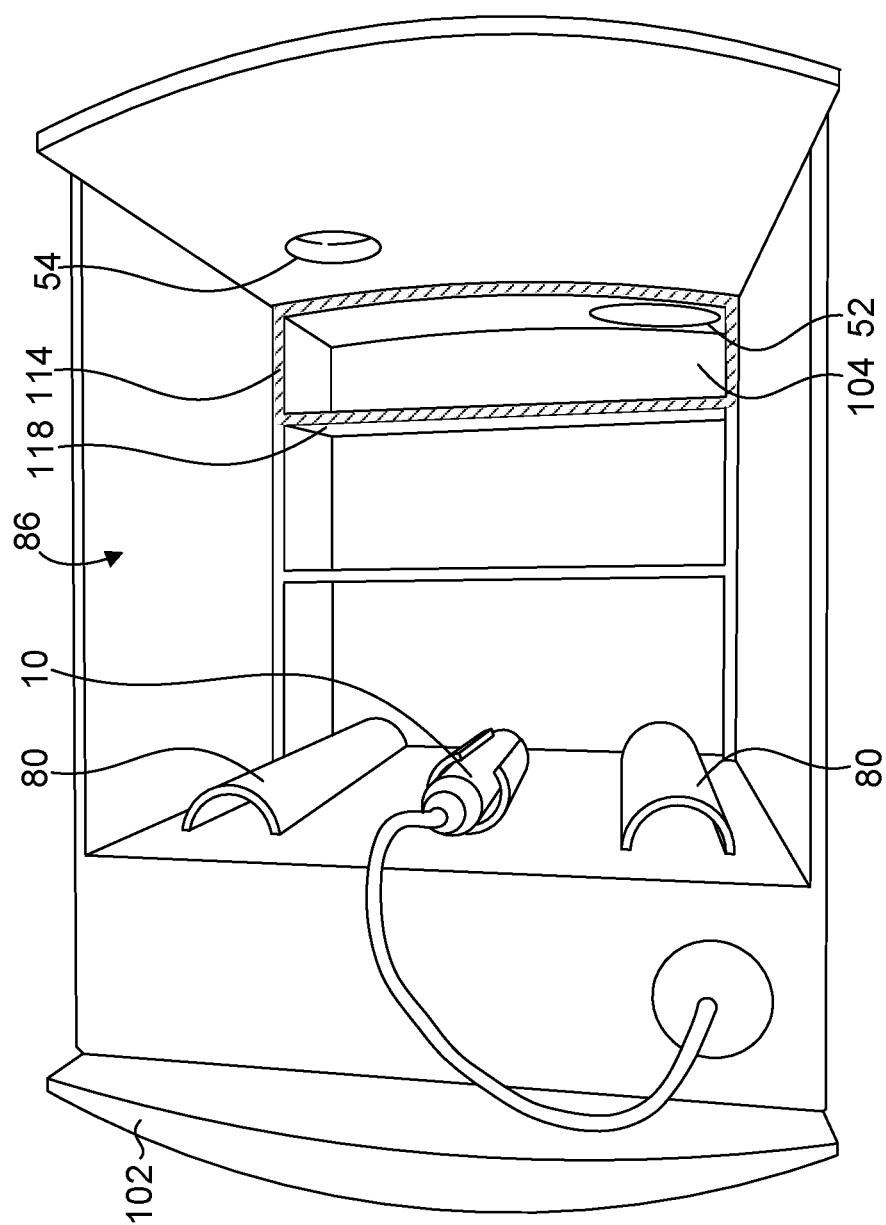
FIG. 20 is a top perspective view of one embodiment of a condensate neutralizer device with its cover removed to reveal its compartment.
Figure 21:
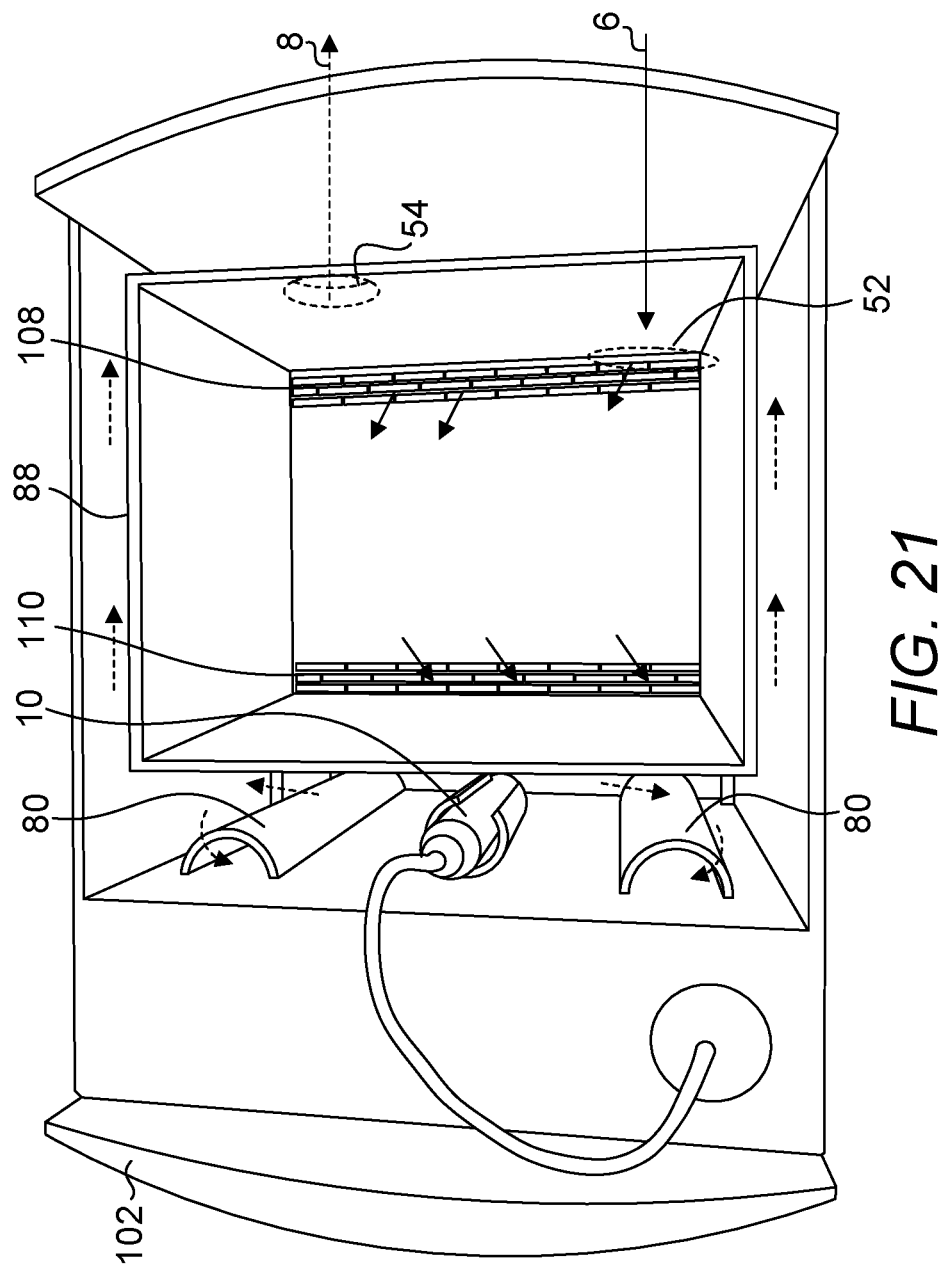
FIG. 21 is a top perspective view of one embodiment of a condensate neutralizer device with its cover removed to reveal a media box that has been installed in its compartment.

FIG. 19 is a cross-sectional view of one embodiment of a condensate neutralizer device. Disclosed herein is a condensate neutralizer device including a compartment 86 having two longitudinal ends, the compartment including a first port 104 and a second port 106, the first port 104 configured for receiving a flow of condensate and the second port 106 configured for draining a post treated flow of the flow of condensate. The compartment 86 is configured for receiving a removable media box shaped and sized substantially the same as that of the compartment. In one embodiment, the compartment is elongated, providing a path of sufficient length for a condensate to be treated. The media box 88 includes a cavity for holding condensate neutralizing materials 4, a first opening 108 configured to connect to the first port 104 and a second opening 110 configured to connect to the second port 106 while the media box 88 is seated in the elongated compartment 86, whereby the flow of condensate is allowed through the cavity such that the flow of condensate can be neutralized by the condensate neutralizing materials 4 disposed in the cavity and the media box 88 can be removed when necessary. In the embodiment shown in FIGS. 19 and 21, each of the first and second openings 108, 110, is a collection of the apertures. Referring to FIG. 18, a condensate flow 6 enters the compartment 86 at port 52 and arrives at port 104. As shown in FIG. 20, port 104 is shown to be formed from a wall 94 which serves both as a wall forming port 104 and a part of a support structure for the media box 88. In one embodiment, port 104 is essentially an enclosure formed from a wall 94 that spans the width of the compartment 86, a portion of the bottom surface of the compartment 86 and short walls that are formed on the sides of the compartment 86, a short end wall formed on the rear end of the compartment 86 and a portion of the bottom surface of media box 88. In one embodiment, in order to ensure that an incoming condensate flow from port 104 can only occur through the first opening 108, a sealant 114, e.g., silicone is disposed atop the short walls surrounding port 114 before dropping the media box 88 over port 104. Notice that if the media box 88 is removed, the compartment 86 is essentially one larger space with several protrusions or walls 94 extending from the bottom surface of the compartment 86, two of which terminating as tongues 94 which are removably coupled with the media box 88 at the grooves 96. As shown with the media box 88 seated, port 104 is isolated from port 106 which is configured to receive treated condensate. In order to arrive at port 106, the condensate flow must enter the cavity of the media box 88 via opening 108 and exit the cavity of the media box 88 via opening 110. A pH meter 10 is disposed just outside of opening 110 to determine whether the condensate which has flowed through the cavity has been substantially neutralized. As there are gaps surrounding the media box 88, treated condensate can then flow around the media box 88 (as shown with arrows of broken lines) to exit the compartment 86 via port 54 as flow 8.

A handle 92 provided atop the media box serves two purposes. First, in one embodiment, it allows a user to easily grasp the media box or at least the media cover 100, upon which the handle 92 is attached, for deployment, replacement or re-seating. The handle 92 also comes in contact with the lid 90 while the media box is seated, allowing the lid 90 to urge the media box 88 downwardly to further secure it in the compartment 86. Further, tongue-and-groove locator pairs are provided to eliminate cross-flows between treated and untreated condensate. As shown, grooves are disposed on bottom portions of the media box 88 while matching tongues 94 are disposed on the bottom portions of the compartment 86 which protrude upwardly and are configured to fit snugly with the grooves 96 of the media box 88. Grooves may alternatively disposed on the bottom of the compartment 86 instead while matching tongues may be disposed on the bottom of the media box 88. Disclosed herein therefore is a condensate neutralizer device having consumables (condensate neutralizing materials) which can be replaced in a minimal number of steps. In replacing the media box, a user can simply open the lid 90, lift the media box 88 by its handle 92, drop a new media box in place and close the lid 90. In an embodiment where the media box 88 is adhered to the compartment 86, preferably packaged condensate neutralizer 4 that comes in a perforated bag will be used to facilitate handling of the condensate neutralizer 4 as the media box 88 is not intended to be removable upon deployment. It shall be noted that, in the present device, an incoming condensate flow in port 104 rises upwardly, as the incoming condensate flow is disposed at a higher temperature than the liquid that is already dwelling in port 104 or compartment 86. Therefore, the incoming condensate flow is naturally drawn into the compartment through the first opening 108 to be treated. Upon treatment, neutralized or cooled liquid now tends to flow downwardly through the second opening 110 and continues to flow around the media box 88 before exiting the device. A flow through the condensate neutralizer device is therefore exposed to condensate neutralizing materials disposed therein and properly neutralized. In one embodiment, the container 50 and media box 88 are each formed from a conventional plastic forming process.

Figure 22:
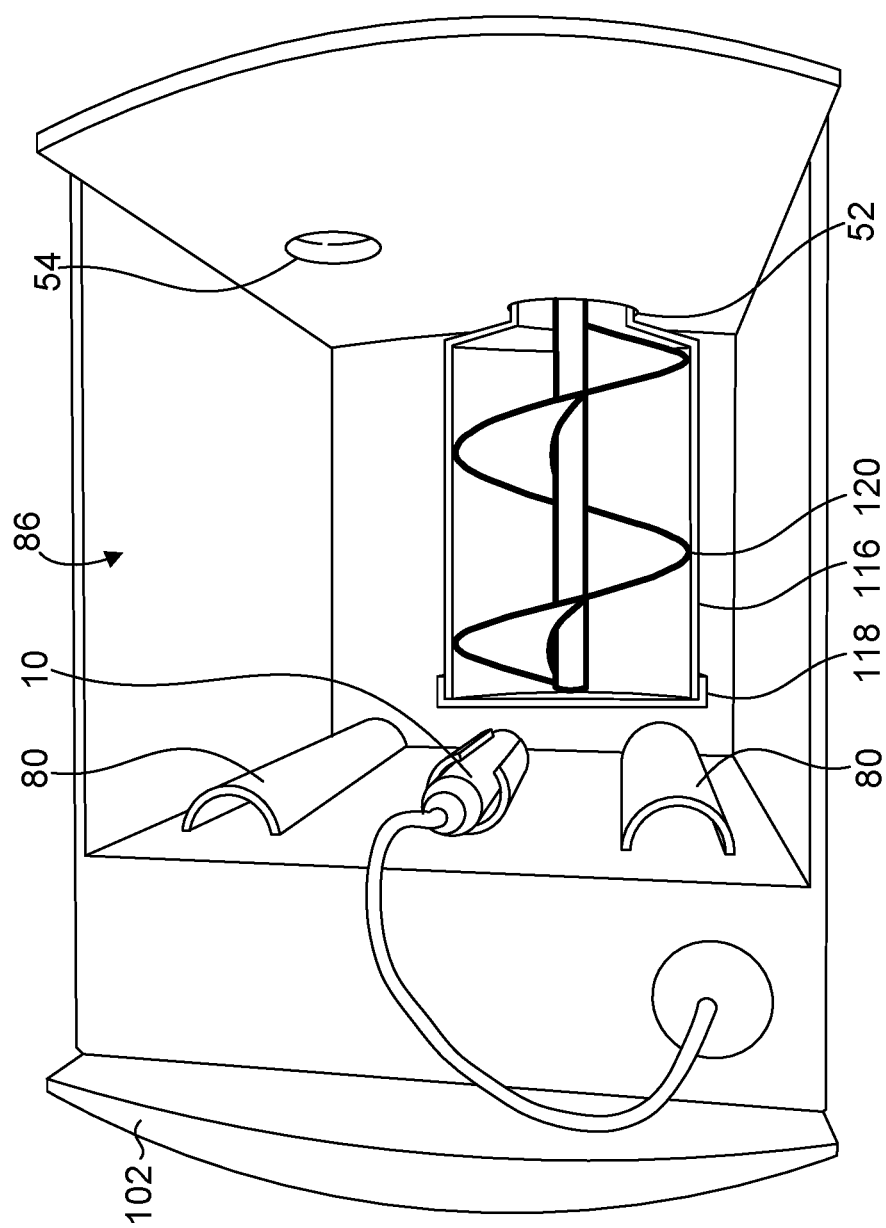
FIG. 22 is a top perspective view of one embodiment of a condensate neutralizer device with its cover removed to reveal a media tube that has been attached to the inlet port of the device in its compartment where the media tube is unfilled.
Figure 23:
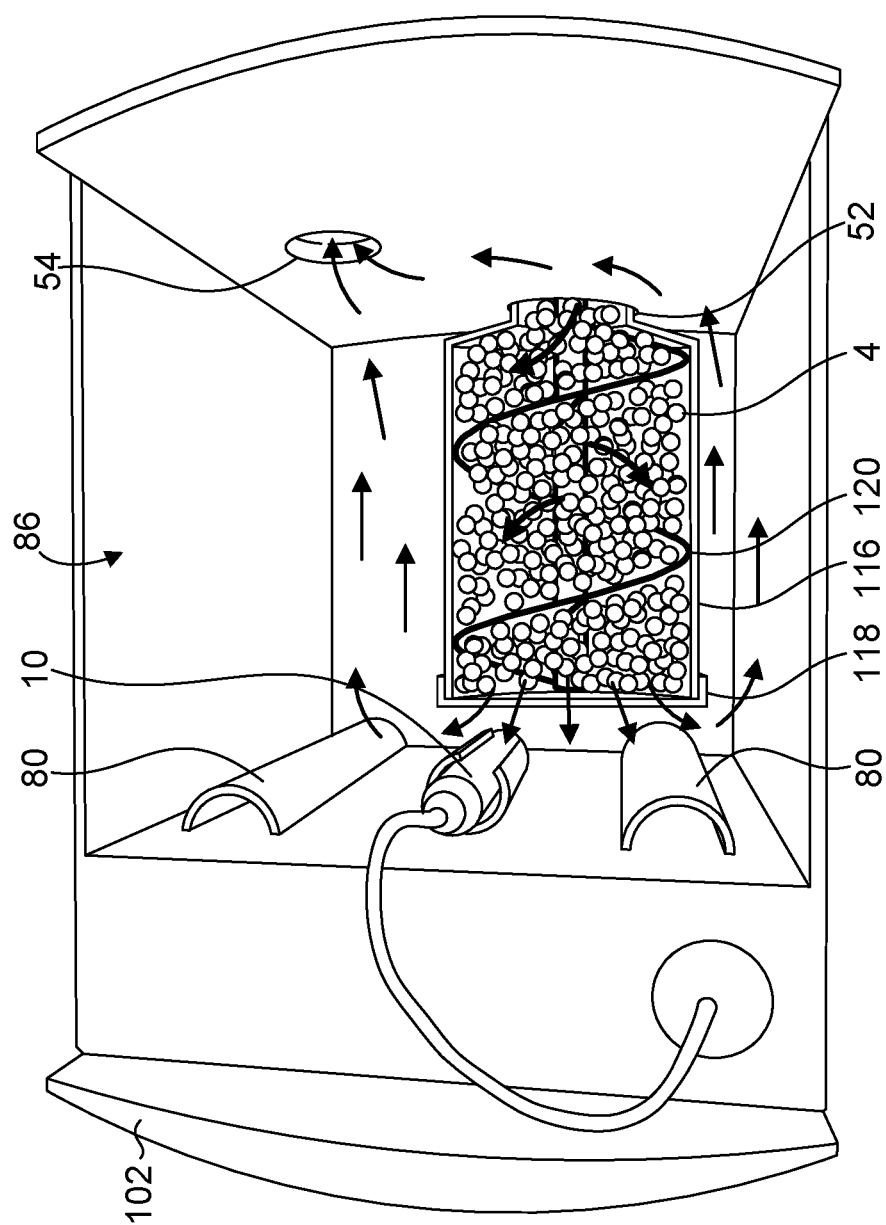
FIG. 23 is a top perspective view of one embodiment of a condensate neutralizer device with its cover removed to reveal a media tube that has been attached to the inlet port of the device in its compartment where the media tube is filled.
Figure 24:
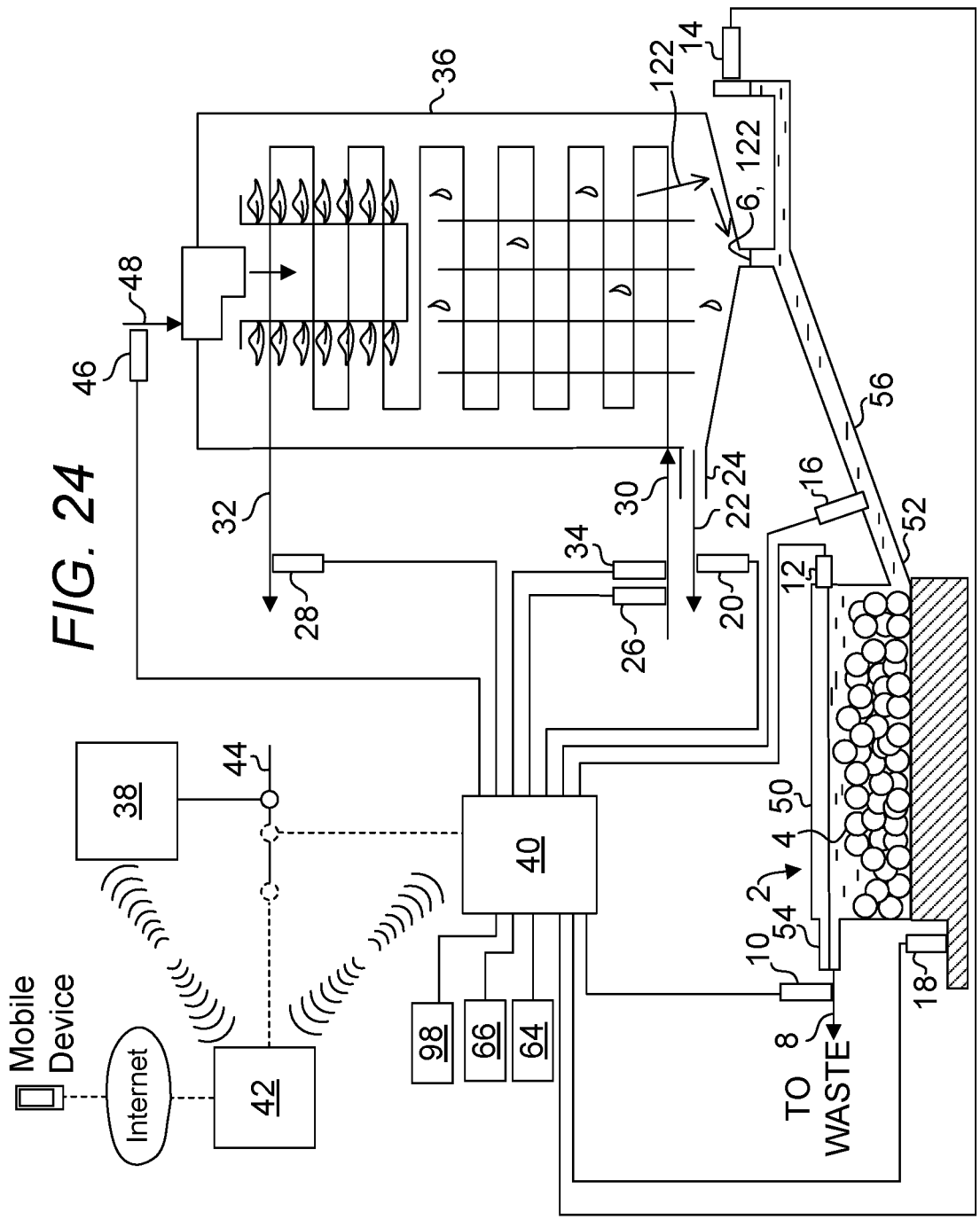
FIG. 24 is a diagram depicting a condensate neutralizer system and the equipment configured for monitoring the health of a tankless water heater which supplies condensate neutralized in the condensate neutralizer system and a leaking condensate generating device.
Figure 25:
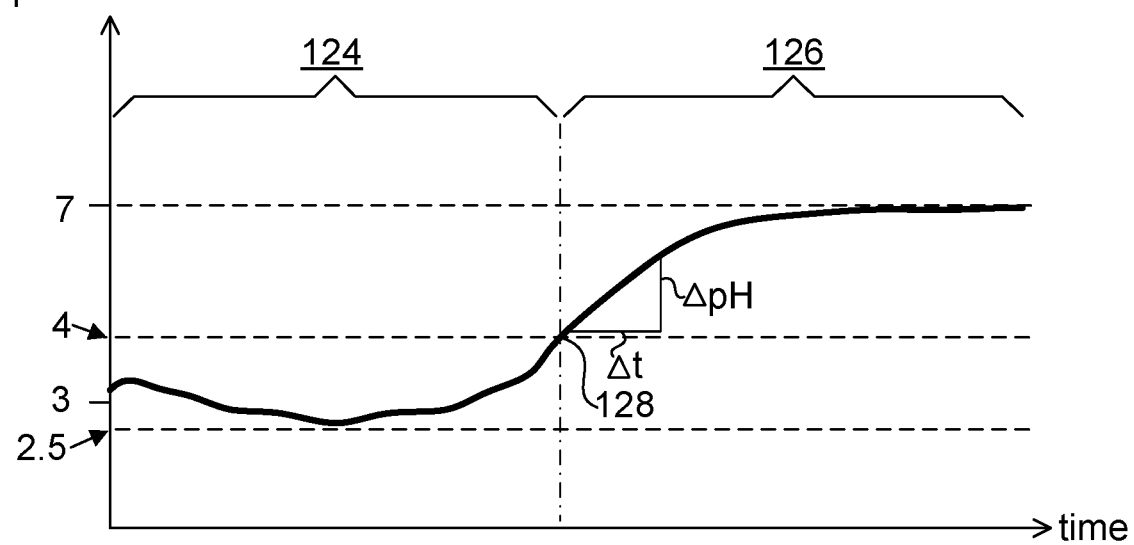
FIG. 25 is a chart depicting the pH of a condensate as sensed at the exhaust of a condensate neutralizer over time and a pattern indicating that a leak has occurred.

FIG. 22 is a top perspective view of one embodiment of a condensate neutralizer device with its cover removed to reveal a media tube 116 that has been attached to the inlet port 52 of the device in its compartment, the tube 116 having a central axis. The media tube 116 is shown unfilled to reveal the auger 120 disposed within the tube 116. The same setup is shown with the tube 116 filled in FIG. 23. In this embodiment, a cross-sectional view of the media tube 116 is shown, depicting one end of the tube 116 shaped substantially the same as the shape of the inlet port 52 but configured smaller such that it can be pressed fit within the port 52 during installation. The opposite end of the tube 116 is configured larger such that an auger 120 can be inserted within the tube 116. The interior of the tube 116 is preferably cylindrical such that the periphery of the auger 120 comes in contact with the interior surface of the tube 116 and that the auger 120 is coaxially aligned with the tube 116 while disposed within the tube 116. In other words, the diameter of the auger is preferably substantially the same as the interior diameter of the tube 116. The tube 116 may be filled while being held in an upright position with an auger 120 already disposed in the tube 116 and the larger opening of the tube 116 disposed at a level higher than the smaller opening of the tube 116 and without a perforated cover 118. Condensate neutralizing materials 4 are then poured into the tube 116 until it is filled. The bottom end of the tube 116 is preferably temporarily closed so that the incoming materials 4 can be retained therein. Once the tube 116 has been filled, a perforated cover 118 is placed over the larger opening of the tube 116 before the tube 116 is placed horizontally. Once placed in a horizontal orientation, the cover for the smaller opening can then be removed. Once the cover has been removed, the tube is now ready to be inserted with its smaller opening into port 52. In one embodiment, the smaller end of the tube 116 is secured to port 52 by friction fit such that all incoming condensate must flow through the interior of the tube 116. In use, an incoming condensate flow is channeled through openings of the auger 120 as shown in the directions depicted by the arrows within the tube 116, i.e., a spiral path delineated by the shape of the auger, thereby properly coming in contact with and neutralized by the materials 4. Upon neutralization, the treated flow exits via the perforated cover 118 and makes its way around the tube 116 to the outlet port 54. FIG. 24 is a diagram depicting a condensate neutralizer system and the equipment configured for monitoring the health of a tankless water heater which supplies condensate neutralized in the condensate neutralizer system and a leaking condensate generating device. As condensate forms in the combustion chamber of a condensate generating device, it collects and drains by gravity through a condensate neutralizer such that its pH becomes higher and closer to being neutral upon neutralization of at least a portion of the condensate. In one example, the condensate generating device is a heating system having a heat exchanger including a combustion chamber surrounding a fluid conductor in which a fluid flow is heated. If a leak develops in the fluid conductor, e.g., due to the weakening of a wall of the fluid conductor or a leak develops on an end of the fluid conductor, the leak may not be noticed outside of the condensate generating device as the leak may follow a path that conceals this flow through a condensate neutralizer and a drainage tube that leads the normally neutralized condensate or post-treated condensate to a handling system or drain. Left unchecked, the leak may not be detected, can significantly increase the drainage volume, can cause the condensate to be poorly neutralized and can unnecessarily consume the neutralizer materials. If the condensate generating device is a natural gas-fired condensing equipment, the pH of the effluent of the condensate neutralizer typically ranges from about 2.5 to 4 under normal operating conditions without a leak in the condensate generating device. FIG. 25 is a chart depicting the pH of a condensate as sensed at the exhaust of a condensate neutralizer over time and a pattern indicating that a leak has occurred. It shall be noted that in the zone labelled part 124, the pH fluctuates between about 2.5 and about 4. The condensate generated by the condensate generating device is deemed adequately neutralized in this range of pH readings, i.e., the neutralized condensate is now less acidic than the untreated condensate. However, if a leak exists in the combustion chamber, the leaked water will continue to flow downwardly by gravity through the neutralizer and out of the condensate neutralizer, essentially along the same path that condensate assumes, also by gravity. As a leak continues, water continues to displace any remaining condensate in the neutralizer, raising the pH of the drainage to the pH of water, i.e., about 7. As can be observed in FIG. 25, the pH continues to rise beyond point 128 and plateaus at about 7. In detecting a water leak that is confined in the condensate drainage, pH readings are obtained over time from the pH meter 10. If the pH readings consistently increase over time at a rate of pH increase of about 2 or over on the pH scale over about 5 minutes or ΔpH/Δt of about 2 over about 5 minutes and the pH is greater than about 4, a warning is raised and preferably also communicated to a stakeholder of the condensate generating device for a possibly leak from the condensate generating device. If the pH reading of the drainage is about 7 after the drainage experienced a rate of pH increase of about 2 or over in about 5 minutes, controller 40 can be programmed to shut down the condensate generating device until the detected leak can be addressed.

Figure 26:
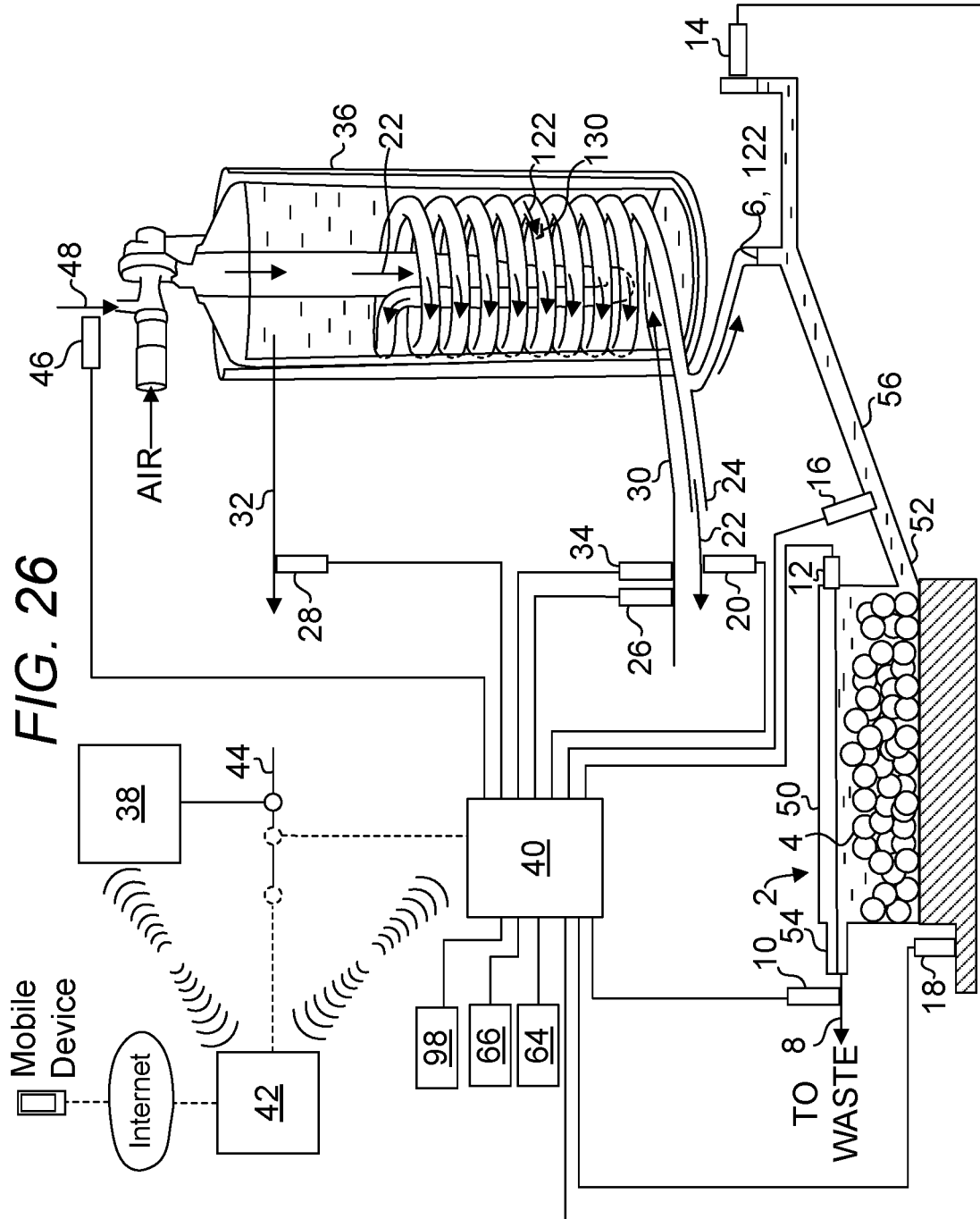
FIG. 26 is a diagram depicting a condensate neutralizer system and the equipment configured for monitoring the health of a tankless water heater which supplies condensate neutralized in the condensate neutralizer system and a leaking condensate generating device.
Figure 27:
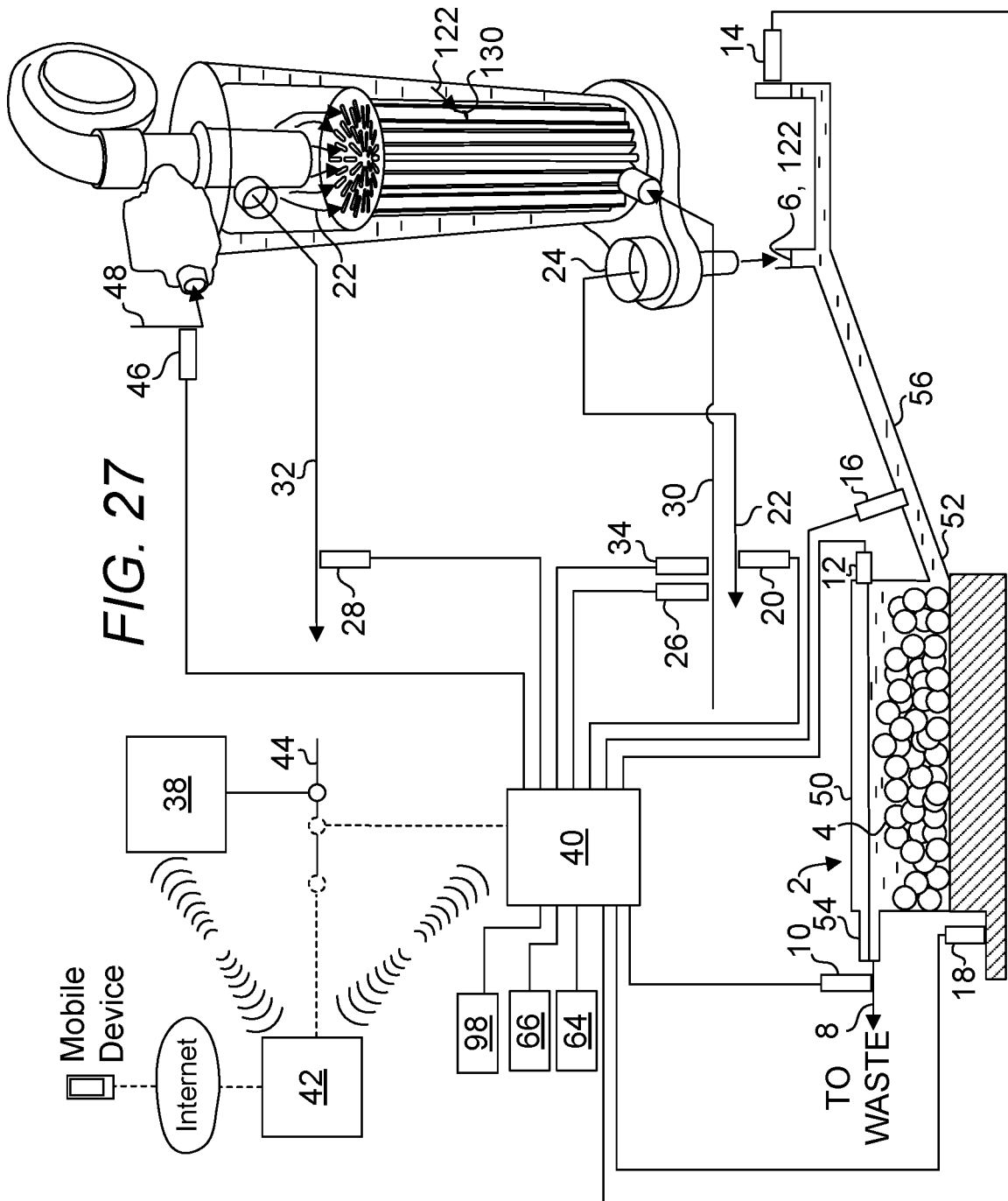
FIG. 27 is a diagram depicting a condensate neutralizer system and the equipment configured for monitoring the health of a tankless water heater which supplies condensate neutralized in the condensate neutralizer system and a leaking condensate generating device.

FIGS. 26 and 27 are each a diagram depicting a condensate neutralizer system and the equipment configured for monitoring the health of a tankless water heater which supplies condensate neutralized in the condensate neutralizer system and a leaking condensate generating device. In FIG. 26, the condensate generating device is a tank or storage water heater. Here, flue is generated and sent through a spiral path or fire tube through a volume of liquid being heated. A breach 130 in the fire tube or barrier that separates the flue from the volume of liquid being heated will cause a leak through the fire tube into the drainage line 56 and eventually exiting the container 50. Without a present leak detector, this leak could simply continue to drain through the drainage line 56 without being noticed for an extended period of time, causing unnecessary loss of water, loss in water heating efficiency or even flooding if this unexpected increase in flow is not mitigated. In FIG. 27, the condensate generating device is a boiler. Here, flue is generated in a combustion chamber on the top end of the device and sent through a plurality of straight paths or fire tubes through a volume of liquid being heated. A breach 130 in a fire tube or barrier that separates a flue path from the volume of liquid being heated will cause a leak through the fire tube into the drainage line 56 and eventually exiting the container 50. Again, without a present leak detector, this leak could simply continue to drain through the drainage line 56 without being noticed for an extended period of time, causing unnecessary loss of water, loss in water heating efficiency or even flooding if this unexpected increase in flow is not mitigated.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A structure for detecting a leak, wherein said structure is supported upon a supporting surface, the structure comprising:
   (a) a leak detector; and
   (b) a bottom-facing surface comprising an inverted depression in which said leak detector is disposed, said inverted depression is configured to be suitable for inducing capillary actions in a liquid collected on the supporting surface, wherein when said inverted depression comes in contact with the liquid, the liquid is drawn to the leak detector to be detected.

2. The structure of claim 1, further comprising at least one capillary contiguous to said inverted depression to increase the opportunity that the liquid comes in contact with said inverted depression and said leak detector.

3. The structure of claim 1, wherein said inverted depression further comprises a height of about 1 mm.

4. A leak detecting system comprising a structure configured to be supported upon a supporting surface, said structure comprising a bottom-facing surface comprising an inverted depression within which a leak detector is disposed, said inverted depression is configured to be suitable for inducing capillary actions in a liquid collected on the supporting surface, wherein when said inverted depression comes in contact with the liquid, the liquid is drawn to the leak detector to be detected.

5. The leak detecting system of claim 4, wherein said structure further comprises at least one capillary contiguous to said inverted depression to increase the opportunity that the liquid comes in contact with said inverted depression and said leak detector.

6. The leak detecting system of claim 4, wherein said inverted depression further comprises a height of about 1 mm.

* * * * *